INVENTOR.
ROBERT E. SELTZER
BY Bosworth, Sessions,
Hensteen & Knowles
ATTORNEYS.

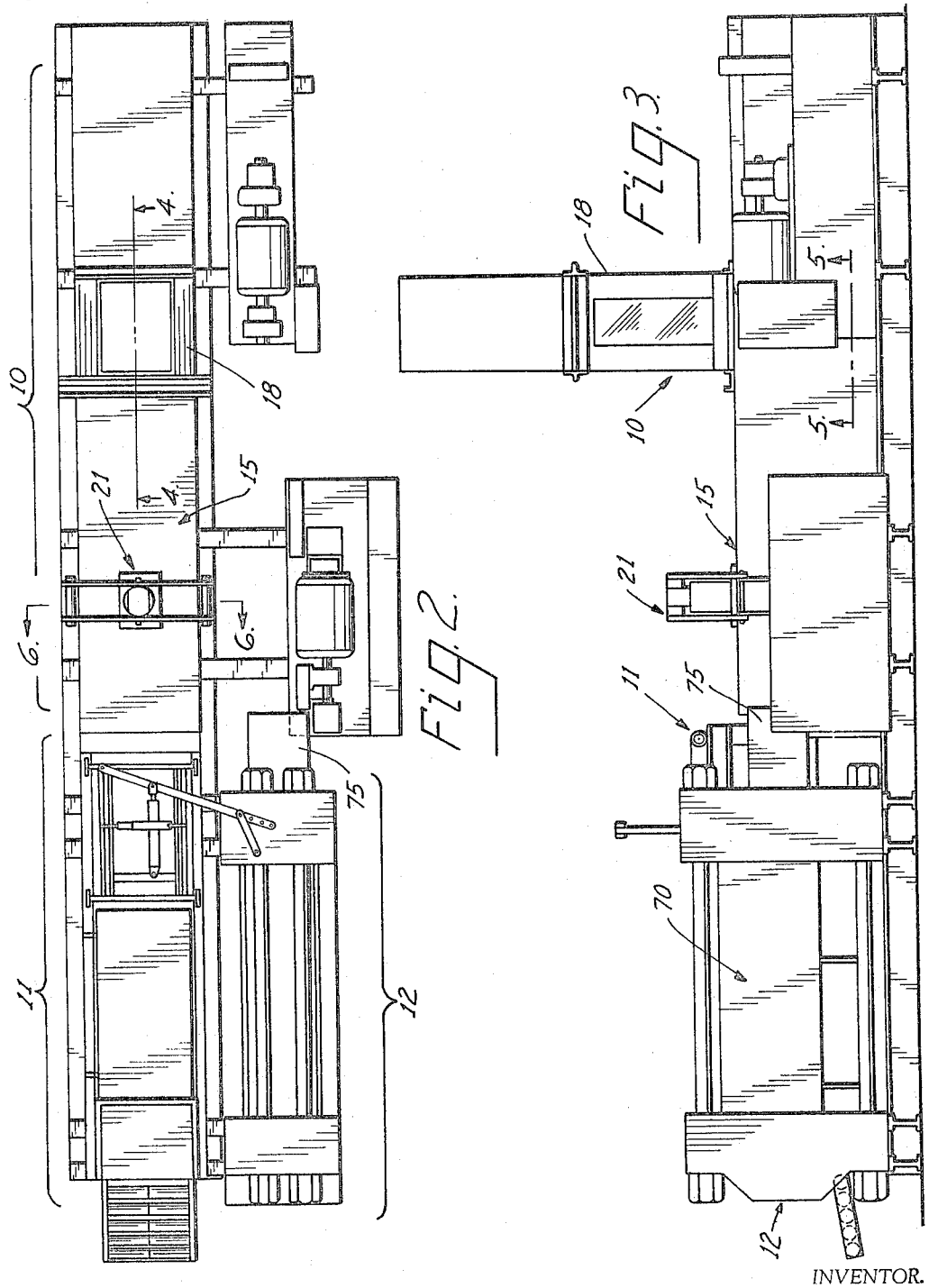

Dec. 27, 1966   R. E. SELTZER   3,294,013
METHOD OF AND APPARATUS FOR BALING
Filed Feb. 23, 1965   10 Sheets-Sheet 3

INVENTOR.
ROBERT E. SELTZER
BY Ellsworth, Sessions,
Hershon & Knowles
ATTORNEYS.

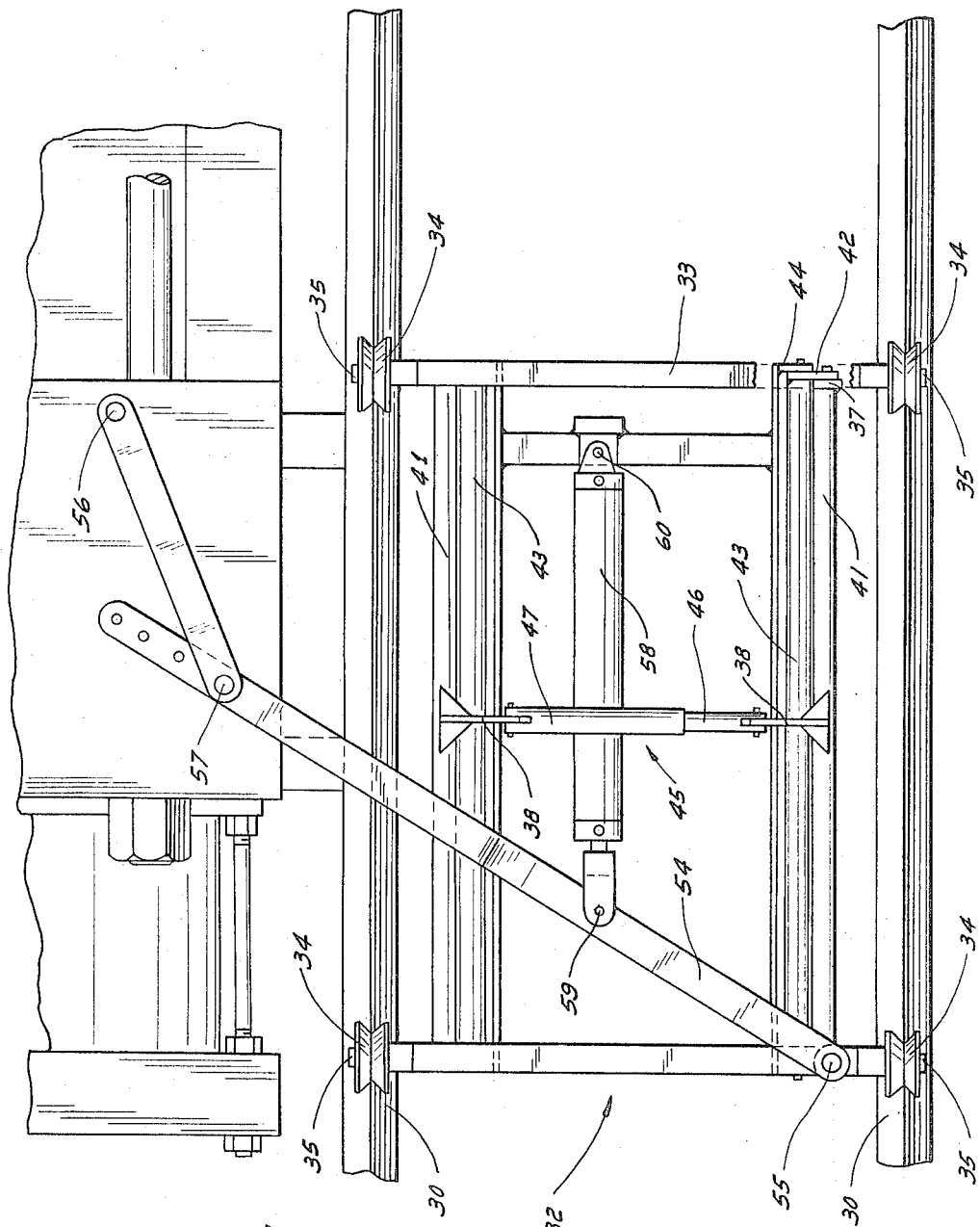

Dec. 27, 1966  R. E. SELTZER  3,294,013
METHOD OF AND APPARATUS FOR BALING
Filed Feb. 23, 1965  10 Sheets-Sheet 5
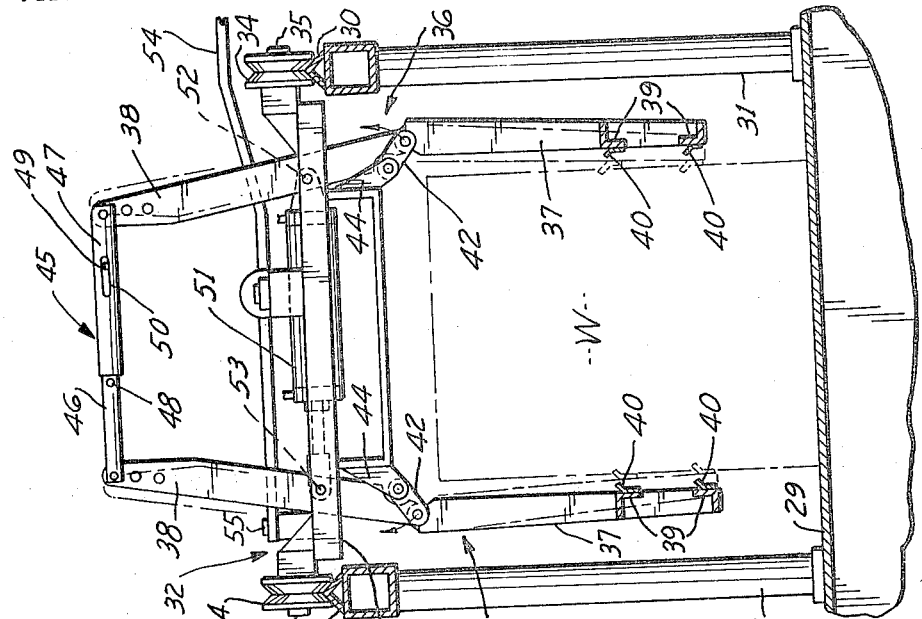
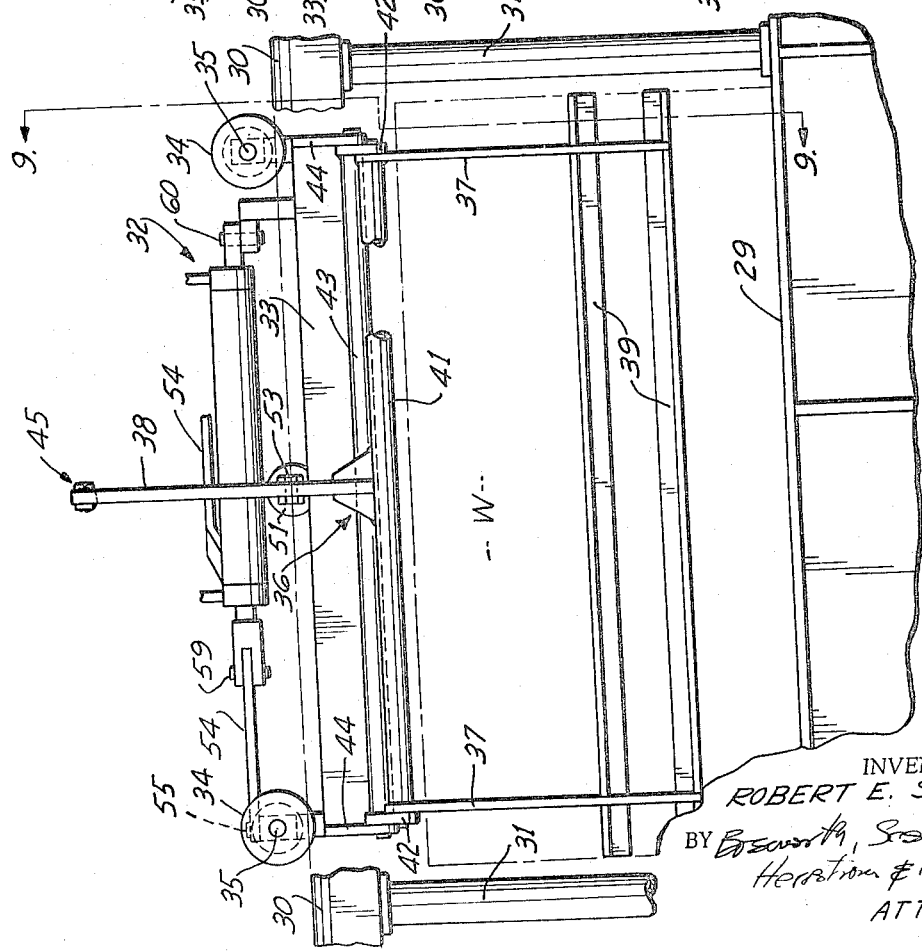
INVENTOR.
ROBERT E. SELTZER
BY Bosworth, Sessions
Herstrom & Knowles
ATTORNEYS.

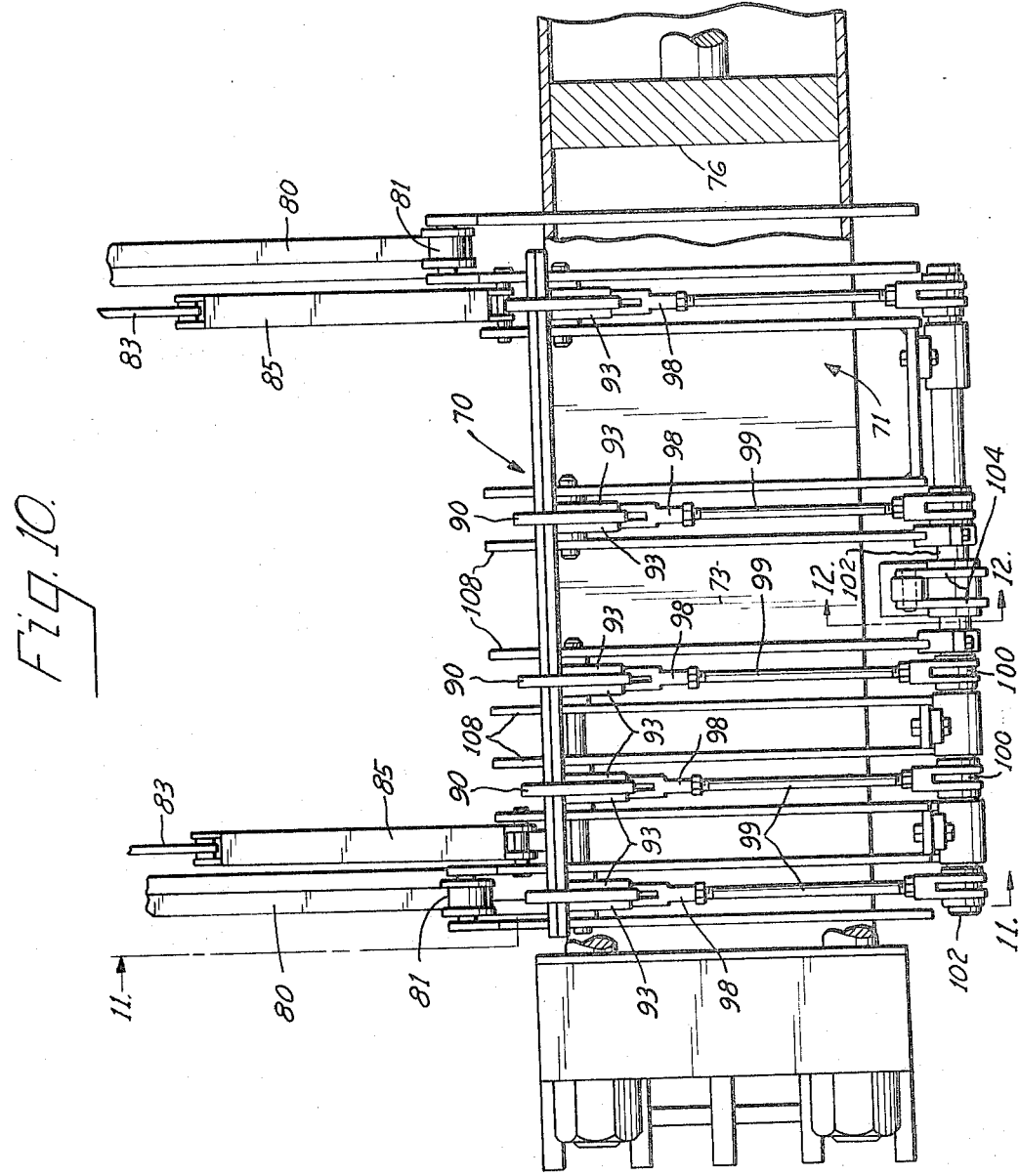

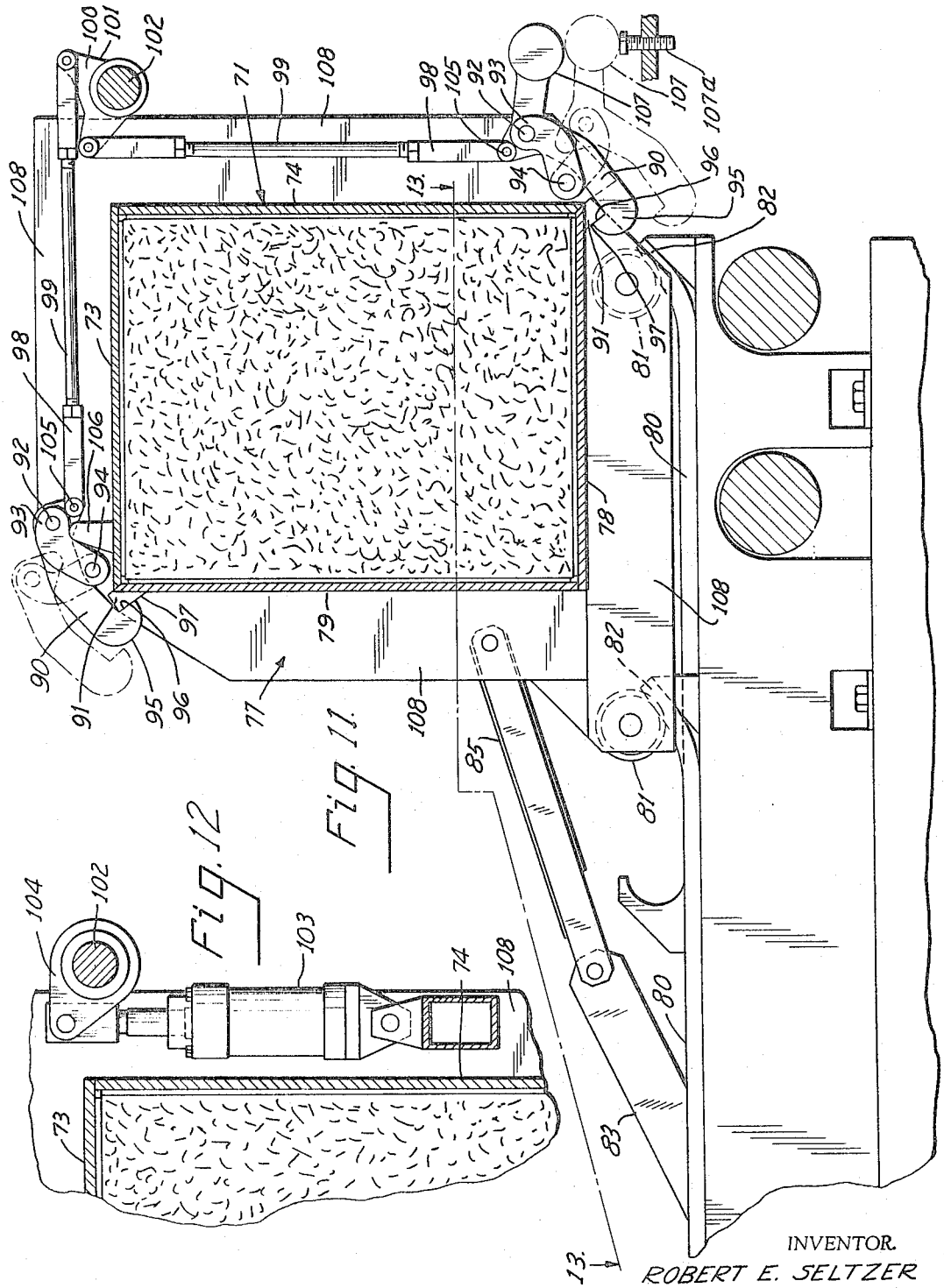

Dec. 27, 1966   R. E. SELTZER   3,294,013
METHOD OF AND APPARATUS FOR BALING
Filed Feb. 23, 1965   10 Sheets-Sheet 8

INVENTOR.
ROBERT E. SELTZER
BY Bosworth, Sessions,
Hornstrom & Knowles
ATTORNEYS

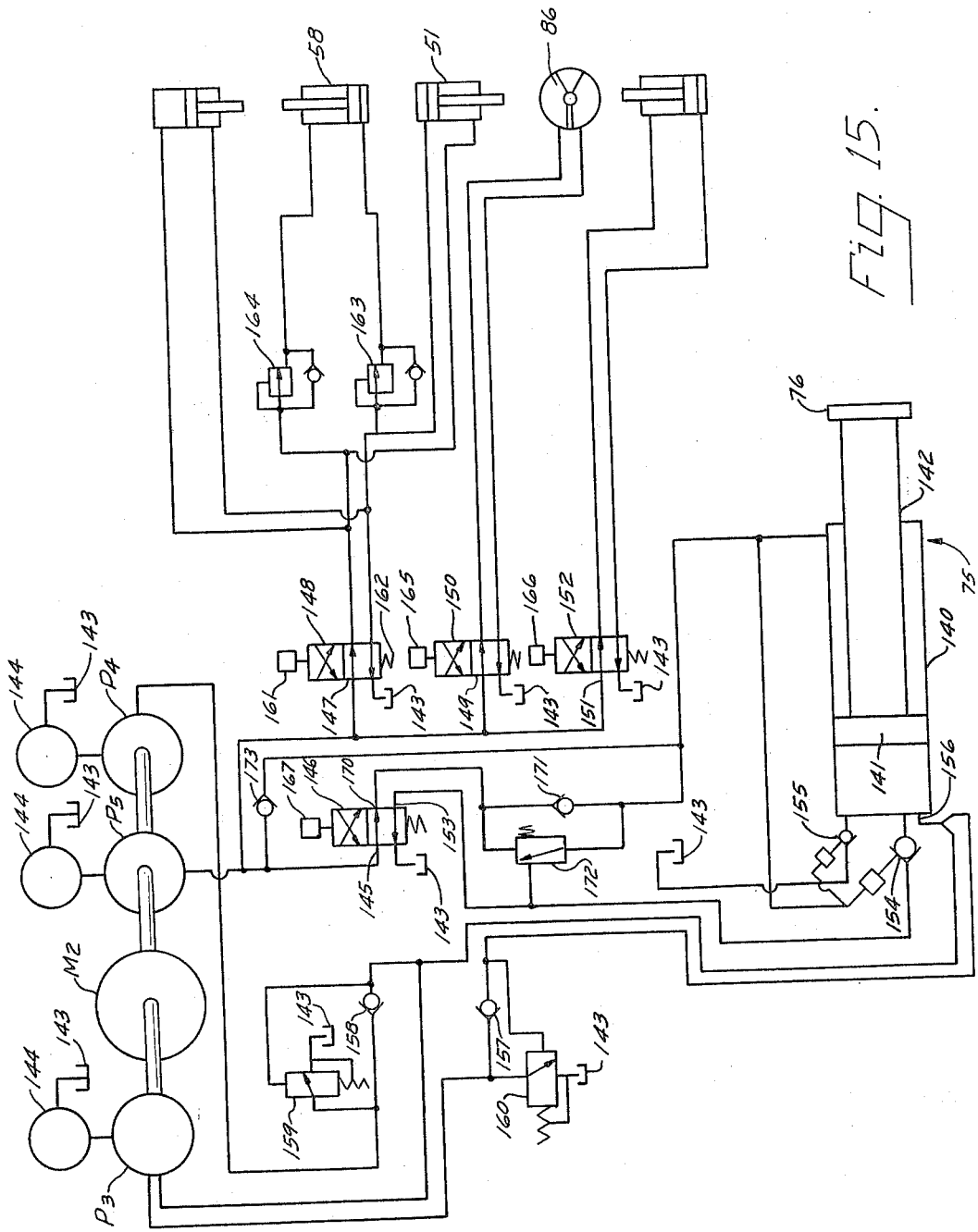

United States Patent Office 3,294,013
Patented Dec. 27, 1966

3,294,013
METHOD OF AND APPARATUS FOR BALING
Robert E. Seltzer, Bellevue, Ohio, assignor to The American Baler Company, Bellevue, Ohio, a corporation of Ohio
Filed Feb. 23, 1965, Ser. No. 434,221
16 Claims. (Cl. 100—41)

This invention relates to a method of and apparatus for substantially reducing the volume and increasing the average density of quantities of loose material and particularly to a method of and apparatus for condensing and compacting quantities of loose material into cubic shapes and to such a degree that the condensed material tends to retain and to support itself in its condensed shape.

The method and apparatus of my invention is useful, for example, in substantially reducing the volume of relatively dry wood pulp and forming it into cubic shapes which tend to retain and maintain their form without binding, banding, or tying. Wood pulp is commonly produced in the form of a relatively dry, lightweight, loose, fluffy material. It is often desirable to transport this relatively dry wood pulp from its point of production to other locations where it may serve as the raw material in various processes for producing finished paper goods. It is convenient and economical when shipping relatively dry wood pulp, and especially when transportation charges are primarily based upon cargo volume, to condense and compact the relatively dry, lightweight, fluffy material into a substantially much lesser volume than it normally occupies. My invention consists of the method of and apparatus for accomplishing this result.

While the following description of my invention is in terms of a method of and apparatus for bringing about very substantial reductions of the volume of quantities of relatively dry wood pulp and its compaction into self-supporting cubic shapes, my invention comprehends the condensation and compaction of materials other than wood pulp and the description of my invention as it relates to wood pulp is for the purpose of illustration and not limitation.

An object of my invention, therefore, is to provide a method for compacting and condensing quantities of relatively dry, lightweight, loose material into cubic shapes of substantially much less volume than that occupied by the material comprising them when in a loose condition. Another object is to provide such a method by which the resulting compacted cubic shapes tend to be self-supporting, i.e., they tend to hold together in the cubic shape in which they are formed so that they may be handled a limited amount as, for example, by mechanical conveying means without falling apart or breaking up. It may well be desirable, of course, to band, tie, or wrap the cubic shapes for protection or greater resistance to handling than their inherent self-supporting characteristic provides. The method of my invention comprehends any suitable cubic shape that may be desired. The two cubic shapes most commonly formed are a cube and a rectangular parallelpiped (brick shape) and I mean such cubic forms, as well as other cubic forms when I use the expression "cubic shape." Another object is to provide such a method which includes two separate compacting and condensing steps or stages. Still another object is to provide such a two-stage method which may be easily, conveniently, and economically adapted for the continuous production of compacted, condensed cubic shapes from a continuous flow of loose material. It is also an object to provide such a method in which an intensified compacted pressure is applied to the material comprising a single cubic shape for an appreciable period of time during which the first compression of the loose material into a prepacked cubic shape is accomplished by the accumulation of successive charges of loose material.

It is also an object of my invention to provide a system of apparatus for compacting and condensing quantities of lightweight, loose material, such as dry wood pulp, into cubic shapes having volumes which are but a fraction of the volume of loose material comprising them when in a loose condition. It is an object to provide a system of apparatus adapted to continuously produce cubic shapes of reduced volume of compacted and condensed loose material that are delivered in a continuous flow to the system. Another object is to provide a system of apparatus having two compression or compaction stages having a high efficiency and high output per unit of time by virtue of its ability to prepack loose material of low density into a prepacked cubic shape of substantially higher density during the time that the preceding prepacked cubic shape is being subjected to a continuously applied high pressure to further substantially increase its density. Another object is to provide such a system of apparatus which includes means for cooperating with and handling the prepacked cubic shapes of material between the two compression and compaction stages. Still another object is to provide such a system of apparatus in which the included interstage handling means cooperates with the two compression compaction stages to separate generally measured lengths of the cubic shape output of the first stage for delivery to the second stage. Still another object is to provide a system of apparatus including such handling means which is capable of gripping and separating and lifting lengths of the cubic shape output of the first stage through an actuating motion in one direction and which can lower and release such measured and separated lengths of cubic shape by an actuating motion in the other direction. Still another object is to provide a system of apparatus having two stages of compression and compaction, including a side-loading second-stage compression chamber able to be easily opened and closed during loading and unloading and positively locked together during the application of pressure in the chamber. Yet another object of my invention is to provide such a system of apparatus adapted to be hydraulically operated and electrically controlled.

These and other objects and features of my invention will become apparent from the following description together with the accompanying drawings in which:

FIGURE 2 is a top plan view of the apparatus shown in FIGURE 1;

FIGURE 3 is a side elevation view of the apparatus shown in FIGURE 1;

FIGURE 7 is a detailed top plan view of the conveyer section of the apparatus shown in FIGURE 1;

FIGURE 8 is a side elevation view of the conveyer apparatus shown in FIGURE 7;

FIGURE 9 is a front elevation view of the conveyer apparatus showing in section the tract upon which it operates and as seen in the plane of line 9—9 in FIGURE 8;

FIGURE 10 is a detailed plan view of the second-stage compression or intensifier section of the apparatus shown in FIGURE 1;

FIGURE 11 is a transverse cross-sectional view through the intensifier section of the apparatus shown in FIGURE 10 and taken in the plane of line 11—11 in FIGURE 10;

FIGURE 12 is a partial transverse cross-sectional view of the intensifier section of the apparatus showing in detail the actuating means and taken in the plane of line 12—12 of FIGURE 10;

FIGURE 15 is a schematic diagram of the hydraulic system of the intensifier section of the apparatus.

General description

Figure 1:
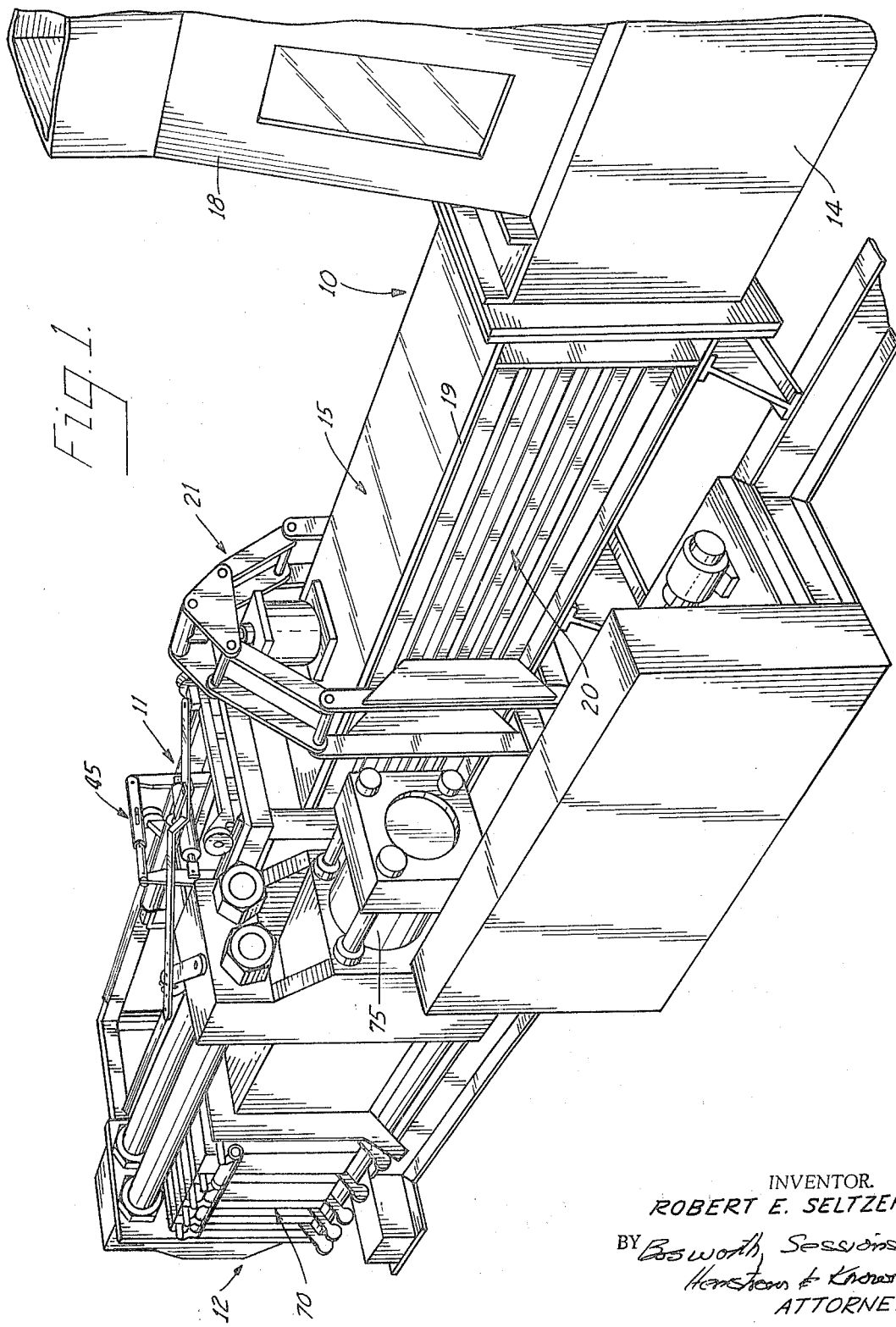
FIGURE 1 is a perspective view of a complete apparatus embodying my invention.

A complete system of apparatus embodying my invention is shown in FIGURES 1 through 3. The apparatus comprising the system can be conveniently divided or sectionalized according to function.

Loose material to be compressed and compacted is first fed into the prepacking or compactor section indicated generally at 10 through a loading chute or hopper leading into a first compression chamber included in the compactor section. In the first compression chamber, charges of the material introduced are successively precompressed and prepacked together with preceding precompressed charges and pushed out of and delivered from the compactor section in the form of a precompressed and packed-together, substantially self-supporting cubic extrusion.

Adjacent the output side of the compactor section is a separating and conveying section indicated generally at 11 which functions to separate generally measured lengths of the extrusion output of the compactor section and convey them to the intense compaction or intensifier section of the system apparatus.

The intensifier section indicated generally at 12 includes a longitudinally split and separable second compression chamber into which the prepacked cubic shape delivered from the compactor section is side loaded. The two parts of the second compression chamber are then closed or locked together by latching means and the prepacked cubic shape contained therein is then subjected to an intense high pressure for an appreciable period of time, accomplishing the further substantial reduction in volume of the cubic shape. At the end of the period of application of the intense applied pressure, the second compression chamber is opened and the ultimately reduced cubic shape removed for delivery by a transfer table from the opposite end of the apparatus from which the loose material was originally introduced. The entire apparatus comprising the three sections, i.e. the compactor section, the separating and conveying section, and the intensifier section, is preferably mounted on a base assembly common to all sections and supported on a suitable floor or foundation. The three sections are thus mounted together in fixed relationship and designed to operate and act together as a fully integrated and related system. In describing the complete apparatus, however, the system will be dealt with on a section-by-section basis.

Compactor section

Figure 4:
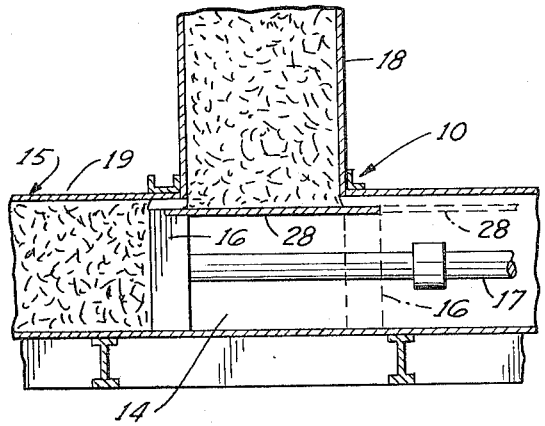
FIGURE 4 is a partial longitudinal cross-sectional view through the delivery chute and first-stage compression chamber in the plane of line 4—4 of FIGURE 2.
Figure 5:
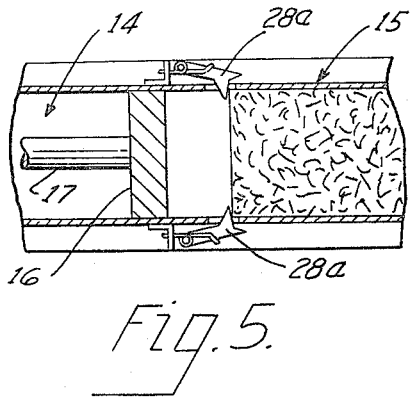
FIGURE 5 is a partial longitudinal cross-sectional view through the first-stage compression chamber in the plane of line 5—5 of FIGURE 3.
Figure 6:
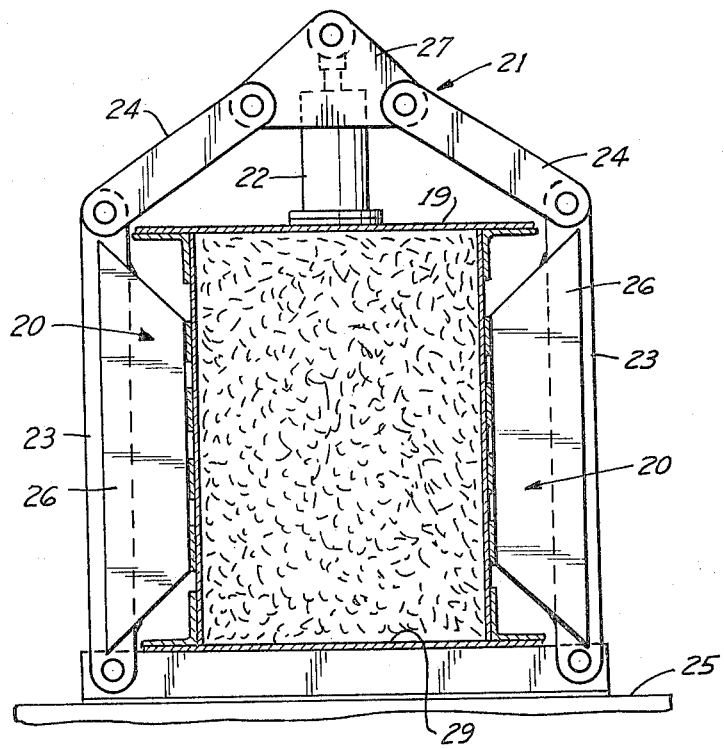
FIGURE 6 is a lateral sectional view through the output section following the first-stage compression chamber shown in FIGURES 4 and 5 and in the plane of line 6—6 of FIGURE 2.

As seen most clearly and in detail in the sectioned view of the compactor section shown in FIGURES 4 and 5, the compactor 10 comprises a generally rectangular compression chamber 14. One end of compression chamber 14 consists of a throttling device indicated generally at 15 in FIGURES 1 through 5 and shown in transverse cross section in FIGURE 6. The opposite end is provided with a movable wall or baling head 16 reciprocatingly driven by first main double-acting hydraulic cylinder 17. Hydraulic cylinder 17 is part of a hydraulic system which actuates the apparatus as described more fully below. Loose material is continuously fed into the apparatus through a chute or hopper 18. When baling head 16 is retracted to its dotted line position shown in FIGURE 4, material is introduced into chamber 14 by gravity or forced air fed, for example, through a top wall 19.

The throttling device 15 at the output end of baling chamber 14 comprises at least a pair of opposite movable side walls, each of which corresponds to the side wall indicated generally at 20 in FIGURE 1. The walls are fixedly mounted, for example, near the extended limit of travel of baling head 16 at the outlet of compression chamber 14, while their opposite ends are able to be moved toward and away from each other and held at varying positions therebetween so as to form a variably tapered constriction or outlet passage having a minimum lateral dimension somewhat less than that of compression chamber 14.

A toggle-like controlling mechanism, indicated generally at 21, is located near the free end of movable side walls 20 and consists of a hydraulic operating cylinder 22 and an arrangement of pivotally interconnceted pairs of links 23 and 24. The lower end of each link 23 is pivotally connected at a fixed point to bed 25 of the apparatus and carries a bearing plate 26 which extends along the height of and engages a movable side wall 20. The upper end of the pairs of links 23 are tied together through two pairs of pivotally connected links 24 and a top or tie link 27. Hydraulic cylinder 22 is arranged to act between the fixed top wall 19 of the compactor section and tie link 27. Extension of hydraulic cylinder 22 raises tie link 27 and draws the upper end of pairs of links 23 inwardly, causing bearing plates 26 to urge the free ends of movable walls 20 inwardly, increasing the taper of the passage between them and the constriction of the outlet from compression chamber 14. Reduction of the pressure or retraction of the piston in hydraulic cylinder 22 lowers tie link 27 and moves pairs of links 23 and bearing plates 26 outwardly, permitting the free ends of side walls 20 to move apart from each other and decreasing the taper in the passage between them. Hydraulic cylinder 22 is part of the hydraulic control system of the apparatus which will be described more fully below. It will be apparent that the resistance to the flow of prepacked material out the compactor section 10 of the apparatus is dependent upon the taper of the passage between movable side walls 20 as positioned by toggle-like mechanism 21.

Baling head 16, as driven by main hydraulic cylinder 17, reciprocates back and forth in compression chamber 14. When fully retracted and at the end opposite the throttling device 15, the lower end of hopper 18 is uncovered and opened by closure plate 28, permitting loose material to be introduced into compression chamber 14 from hopper 18 and to fill the chamber in its loose condition. Baling head 16 is then advanced toward the throttling device end of compression chamber 14 and compacts and condenses the charge of loose material into a layer or wafer having a cross-sectional area corresponding to that of the compression chamber and of substantially reduced volume from the volume occupied by the loose material comprising it. This relatively thin, compacted layer of loose material stands at the end of compression chamber 14 or at the entrance of the throttling device 15 upon the retraction of baling head 16 to the opposite end of the chamber for the reception of a succeeding charge of loose material from the hopper. The degree of compaction imparted to it, together with the friction between it and the side walls surrounding it and the operation of retaining dogs 28a (see FIGURE 5), all cooperate to cause the wafer to stand otherwise unsupported in the entrance of the throttling device.

Each time baling head 16 is retracted away from the throttling end of compression chamber 14, successive charges of loose material are delivered to the compression chamber from the hopper. Each advance of the baling head produces a thin layer or sandwich of substantially compacted loose material having a cross section substantially equal to that of the compression chamber and of substantially reduced volume relative to the volume originally occupied by the loose material comprising it.

As successive charges of loose material are fed into the compression chamber and the baling head advances and retracts to produce successive layers of material as described above, the sandwiches themselves are advanced into, through, and out of the throttling device 15. While advancing through the throttling device, the succession of thin layers or sandwiches of compacted material are reduced slightly in cross-sectional area by the taper introduced into the passage through throttling device 15 as explained above. The throttling device thus produces considerable resistance to the flow of successive layers of compacted material through it and thus serves to provide a yieldable resistance against which succeeding charges of loose material are packed and condensed by the baling head during its advance strokes. The resistance provided by the throttling means also aids in the packing together of successive thin layers or wafers of compacted material due to the pressure successively applied each time the baling head advances to compress and compact together a new and succeeding layer. Obviously, the amount of the resistance can be controlled by toggle-like mechanism 21.

Once the length of the throttling device is filled with successively prepacked layers of material, a self-supporting cubic extrusion W, made up of successively produced, prepacked, and compacted layers held together by successive applications of pressure, advances from the outlet end of the throttling device onto a smooth table or platform 29 extending into the forward end of the lifting and conveying section.

*Separating and conveying section*

The separating and conveying section 11 of the apparatus performs the function of removing from the forward end of the self-supporting and continuous cubic extrusion output of the compactor section a generally measured length of material and carrying it to the intensifier section. Separating and conveying section 11 is then restored to a condition in which it is ready to receive and remove a succeeding length of the extruded prepacked material while the delivered length is being processed in the intensifier section.

At the very beginning of its cycle of operation, the separating and conveying section must cleanly separate a length of prepacked and continuously extruded material from the forward end of the continuous extrusion output of the compactor. The separated portion is preferably of a generally measured length related to the length of the second-stage compression chamber of intensifier section 12 as described more fully below.

The separating and conveying section also is required to handle each separated length of extruded material in such a way that it will not break up or apart and will substantially retain its form and condition of delivery from the compactor section. It should be noted that the tendency of the prepacked material flowing from the compactor section to retain its prepacked shape is not as great as the tendency of the cubic shapes processed in the intensifier section to retain their shape.

A preferred form of apparatus for accomplishing the operational objects mentioned above is shown generally and in relationship to the system of apparatus in FIGURES 1 through 3 and alone in greater detail in FIGURES 7, 8, and 9. As seen most clearly in FIGURE 2, the compactor and intensifier sections 10 and 12, respectively, of the apparatus are so arranged that the transfer mechanism of the separating and conveying section 11 need only accomplish a straight-line transfer of the prepacked material between sections 10 and 12. It will be apparent, however, that other arrangements of the compactor and intensifier sections than the particular one shown may be employed because the separating and conveying apparatus can easily be made to transfer the prepacked material along other than straight paths.

As seen in FIGURES 7 and 9, for example, separating and conveying section 11 includes a pair of parallel, spaced apart rails 30. As shown in FIGURES 1 and 2, rails 30 begin at the outlet end of the tapering passage of compactor section 10 and extend longitudinally from this point to the far end of the intensifier section 12 and along the side of the second compression chamber portion thereof as will be described more fully below. Posts 31, standing on table or platform 29, support rails 30 at points along their length and at a level above the upper face of the compactor section's continuous extrusion output appearing in broken outline and designated W in FIGURES 8 and 9. Posts 31 are laterally spaced apart a sufficient distance to permit the unobstructed passage of the continuous extrusion output W from compactor section 10 on platform 29 along a path between and generally parallel to rails 30.

A transfer car, indicated generally at 32, is provided for operation on and along rails 30. The car consists essentially of a rectangular framework 33 having wheels 34 mounted on axles 35 at its corners. Rails 30, of course, may be located at other levels on either side of the path of the continuous extrusion output from the compactor section provided the corresponding rearrangements of the transfer car 32 and its wheels are made so that the framework of the car can pass over and clear the top of the continuous extrusion output W.

Traveling transfer car 32 is provided with a gripping mechanism consisting of a pair of cooperating gripping arms 36. As seen in detail in FIGURES 8 and 9, each gripping arm 36 is made up of a parallel pair of lower arm elements 37 spaced apart along each side of framework 33 and an upper arm element 38 located above and between the lower arm elements. The lower portions of lower arm elements 37 are joined together by longitudinally extending gripping bars 39 formed of angled stock, for example, and each preferably provided with upwardly and inwardly inclined, longitudinally extending gripping flanges 40. The upper end of each of lower arm elements 37 is interconnected and held in spaced relationship by a longitudinal element or tube 41. Upper arm element 38 is attached to and projects upwardly from longitudinal tube 41.

The gripping arms 36 are hung within rectangular framework 33 along its opposite longitudinal sides so that lower arm elements 37 extend downwardly below rectangular framework 33 toward platform 29 and on opposite sides of extrusion output W standing on it. Upper arm elements 38 extend upwardly through and above rectangular framework 33.

Gripping arms 36 are attached to rectangular framework 33 of the transfer car by means of swinging links 42. One end of a link 42 is pivotally connected to each end of tubes 41. The other ends of the pair of links connected to each tube 41 are interconnected by a longitudinal element or tube 43 which holds them in fixed laterally spaced relationship as well as a fixed parallel angular relationship. Each tube 43, in turn, is pivotally connected to pairs of projections 44 extending downwardly from rectangular framework 33 as shown in FIGURES 7 and 8.

The upper ends of the two upper arm elements 38 are interconnected by a lost motion connection which extends transversely of the transfer car as indicated generally at 45 in FIGURE 9. Connection 45 consists of a tube 46 telescoping and received within another tube 47. A fixed pin 48 in inner tube 46 is arranged to engage the end of outer tube 46 to limit the extent to which the tubes may telescope together. Another fixed pin 49 extends through and operates in suitably located slots 50 in outer tube 47 for limiting the telescoping extension of the two tubes.

When positioned to receive, separate, and pick up a length of extrusion output W, gripping arms 36 hang substantially vertically along the opposite longitudinal sides and inside rectangular framework 33 as shown in solid outline in FIGURE 9. Each swinging link 42, interconnecting gripping arms 36 to rectangular framework 33, extends downwardly and outwardly at about 45°. The links are prevented from swinging downwardly and inwardly any farther by the engagement of the oppositely facing inner edges of upper arm elements 38 and the adjacent one of tubes 43.

Gripping arms 36 are actuated by a double-acting hydraulic actuator 51. One end of actuator 51 is pivotally connected to one of upper arm elements 38 as at point 52 and the other end is similarly connected to the other upper arm element 38 as at point 53. Actuator 51 forms a part of a hydraulic system included in the system of apparatus embodying my invention and to be described more fully below.

In operation, extension of hydraulic actuator 51 from its position shown in FIGURE 9 first moves oppositely facing gripping arms 36 from their solid outline position shown to the broken outline position shown in FIGURE 9. This motion spreads the upper arm elements 38 and brings lower arm elements 37 toward each other and into engagement with the opposite longitudinal sides of the cubic extrusion output W of the compactor section. Gripping flanges 40 on each of lower arm elements 37 are pressed into the sides of the output extrusion W, insuring a sure grip on it by gripping arms 36.

At this point, further movement of lower arm elements 37 toward each other is limited by their engagement with the opposite sides of extrusion output W. Further extension of hydraulic cylinder 51, however, moves upper arm elements 38 still further apart as permitted by the upward and outward swing of links 42 as indicated by the arcuate arrows in FIGURE 9. This swinging motion of links 42 raises their points of pivotal interconnection with gripping arms 36, thereby causing gripping arms 36 to be raised above their level shown and to lift a length of cubic extrusion output W engaged by their lower arm elements 37. Links 42 swing outwardly and upwardly to an approximately horizontal position. With a length of cubic extrusion between gripping arms 36, the sequence of motions of gripping arms 36 and swinging links 42 resulting from the retraction of hydraulic cylinder 51 is the reverse of the sequence of motions produced by the extension of that cylinder.

Transfer car 32 may be moved on and along the rails by any suitable means. A simple and preferred apparatus for doing this is shown in FIGURES 2 and 7. A jointed transfer arm 54 is pivotally connected at one of its ends to a point 55 on the transfer car 32 and at its opposite end to a fixed point 56 on the assembled machine. Arm 54 is jointed between its ends at elbow 57. All parts of arm 54 swing in a generally horizontal plane about the vertical axes of its connections.

The transfer arm 54 is actuated by a double-acting hydraulic actuator 58 connected at one end of the transfer arm 54 at point 59 located between its connection point 55 with the transfer car 32 and its elbow 57. The other end of actuator 58 is pivotally connected to the transfer car 32 at point 60 which is longitudinally spaced from the point 55 of connection of the transfer arm and the transfer car. Transfer arm 54 and its actuator 58 are arranged so that their movements do not conflict with the gripping arms mechanism. Transfer car 32 is positioned at one end of its rails when actuator 58 is extended and at the opposite end of its rails when the actuator is retracted. Actuator 58 forms a part of the complete hydraulic system of the machine and timing of its operation will be explained in connection with the description of the hydraulic system.

In order to separate a length of the prepacked continuously extruded output W of the compactor and transfer it to intensifier section 12, the transfer actuator 58 is energized so as to position car 32 at the end of rails 30 adjacent the outlet of compactor section 10. Actuator 51, controlling the movements of gripping arms 36, is retracted to position the upper arms 38 a fixed minimum distance apart permitted by the lost motion connection 45 and to position swing links 42 in their most downwardly and inwardly inclined position. The lower or gripping ends of the gripping arms 36 are spaced apart a distance somewhat greater than the width of prepacked continuous extrusion W coming out of the compactor.

As the prepacked material is continuously extruded from the compactor, it slides on a bed or platform 29 aligned with and/or as an extension of the floor of the compactor along a path that carries it underneath transfer car 32 and between the lower ends of gripping arms 36. When the forward end of the continuous extrusion passing out of the compactor has reached beneath the transfer car and to the opposite ends of gripping bars 39 attached to the gripping arms 36, the gripping arm actuator 51 is extended. During the initial part of its extension, gripping arms 36 pivot about their connections with swing links 42 bringing their lower ends toward and into engagement with the opposite longitudinal sides of the continuous extrusion as described above. The upper ends of gripping arms 36 separate but normally do not reach the limit of their separation as permitted by the lost motion connection 45. When the lower ends of the gripping arms 36 have firmly engaged the opposite sides of continuous extrusion W and are thereby restrained from moving closer together, further extension of the actuator 51 causes the pivotal connection points of the gripping arms and links to swing outwardly and upwardly. As links 42 swing, the upper end of arms 36 must move further apart in order to maintain their lower ends in gripping engagement with the prepacked material between them. The extent of the possible spread of the upper ends of the arms and thereby their lower ends is limited by the lost motion connection 45 in order to allow certain sequencing valves in the hydraulic circuit to operate when gripping arm actuator 51 is operated without any continuous extrusion W between the gripping arms for holding them apart. This will appear more clearly in connection with the description of the hydraulic circuit below.

The operation of gripping arms 36 in response to forces applied to them by actuator 51 and because of their connections, all as described above, tends to grasp and lift vertically upwardly the forwardmost end of continuous extrusion W. The length of the portion lifted corresponds to the length of the longitudinal gripping bars 39 on the lower ends of the gripping arms.

During the extension of actuator 51 and the resulting gripping and lifting of the forwardmost end of continuous extrusion W, transfer car 32 commences to be moved by actuation of hydraulic actuator 58, thus tending to separate and pull the length of continuous extrusion W gripped between gripping arms 36. The portion to be separated from the extrusion is thus subjected to a shearing and a pulling force tending to separate it for transfer to the intensifier section. The control and production of these generally simultaneously acting forces are accomplished by the hydraulic system as explained below. Briefly, the hydraulic actuator tending to move transfer car 32 commences to work in response to an increase in pressure in gripping cylinder 51 so that the length of continuous extrusion W to be lifted and conveyed is separated from the continuous extrusion by forces which initially are predominantly shearing and only slightly pulling but which are respectively and simultaneously decreased and increased so that the separation is completed by mostly a pulling force and only slightly a shearing force.

I have found that the operation of gripping bars 36, as described above, produces a clean separation of the lifted length of material from continuous extrusion W at approximately the end of the gripping bars nearer compaction section 10. The separation occurs substantially along a plane perpendicular to the length of continuous extrusion W apparently because extrusion W is composed of compacted layers having prepacked engaging surfaces lying in planes parallel to the desired planes of separation and, further, because the lifting motion of the mechanism, initially at least, tends to apply mostly a shearing force along the desired plane of separation.

With the length of extruded material held between the lower ends of gripping arms 36 and lifted vertically away from platform 29 beneath transfer car 32, actuator 58 is operated to move the car to the opposite end of its rails. During passage along the rails, the length of extruded material preferably does not touch or rub any part of the structure that might disrupt its form.

With the transfer car at the opposite end of its rails, the extruded length carried by it is suspended slightly above and directly over the receiving station of intensifier section 12, to be described more fully below. At this point, retraction of the gripping arm actuator 51 lowers the transferred length of material by allowing links 42 to swing downwardly and inwardly. During this operation, the lost motion connection tends to shorten. When the transferred length of material rests on the receiving station of intensifier section 12, further retraction of the gripping arm actuator 51 causes the lower end of the arms to move apart and away from the sides of the transferred length of material. At this point, transfer car 32 is returned to the other end of rails 30 by operation of the transfer actuator 58 where the car stands positioned to separate and convey the next length from the forward portion of the continuously extruded material issuing from compactor section 10. In the meantime, the length of material just transferred stands ready to be side loaded into the pressure chamber of intensifier section 12 as described below in connection with the operation of that section of the system of apparatus.

*Intensifier section*

The intensifier section 12 of the system of apparatus comprising my invention consists primarily of a pressure chamber adapted to receive and apply an intense high pressure for an appreciable period of time to a unit length of the continuous extrusion output W of the compactor section 10. In the general layout of the preferred form of apparatus shown in FIGURES 1 through 3, the intensifier section 12 is generally aligned with the axis of compactor section 10. Lengths of the continuous extrusion output W of the compactor section are delivered to the intensifier section by the separating and conveying apparatus 11.

As shown in some detail in FIGURES 10 through 13, the pressure chamber 70 of the intensifier section is generally of a box shape and is divided into two separable parts to permit loading and unloading cubic shapes into and from it. The first part, indicated generally at 71, is stationary and fixed to the bed of the apparatus and consists of an end wall 72, a top wall 73, and a closed side wall 74. These stationary walls are mounted and arranged on the sub-base assembly and are related to a relatively short stroke, high pressure hydraulic fluid actuator 75 so that a movable end wall 76 may be mounted and operated into and out of pressure chamber 70. Movable end wall 76 corresponds to fixed end wall 72 and is moved by actuator 75 toward and away from it. The fixed and stationary part of the pressure chamber, together with movable end wall 76, thus comprises a closed box less one side wall and a bottom wall.

The necessary walls to complete pressure chamber 70 comprise the movable half or part, indicated generally at 77, of chamber 70 that is separable from the fixed and stationary part 71. Thus, movable part 77 consists of a generally horizontal wall 78 and a generally vertical wall 79 related and fixed at right angles to each other and adapted to move laterally of the fixed part 71 of pressure chamber 70 so that the lower horizontal wall 78 forms the bottom of chamber 70 and the perpendicularly related or vertical wall 79 completes the chamber by forming a side.

Movable chamber part 77 is moved laterally toward and away from the fixed and stationary chamber part 71 on and along suitable rails 80 lying beneath the stationary part and extending laterally from it. Movable part 77 of chamber 70 is provided with appropriate slide guides or wheels 81 which ride on rails 80 and carry and guide the movable part to and between a closed position in which horizontal and vertical walls 78 and 79 of movable chamber part 77 fit together with stationary chamber part 70 and complete the pressure chamber and an open position in which horizontal and vertical walls 78 and 79 are spaced laterally away from stationary chamber part 70.

Pressure chamber 70 and the separating and conveying mechanism are physically so related that rails 30 carrying transfer car 32 extend over movable chamber part 77 when it is separated laterally from stationary chamber 71. Movable part 77 must be able to be positioned with respect to the conveying mechanism so that gripping arms 36, depending from transfer car 32 and holding a length of output extrusion W, pass between and clear vertical wall 79 of movable chamber part 77 and stationary chamber part 71. Thus, transfer car 32, carrying a length of output extrusion W, can lower it vertically onto horizontal wall 78 of movable part 77. When a length of output extrusion W has been placed on horizontal wall 78, movable chamber part 77 is moved laterally as explained below and operates as a transfer table to transfer the cubic length into intensifier pressure chamber 70 for processing. Upon the completion of processing in the intensifier pressure chamber, the processed cubic length is removed from the chamber by lateral and separating movement of movable chamber part 77.

When a bale has been reduced to its smallest volume and greatest density in the intensifier section 12, the bale is withdrawn from the intensifier pressure chamber 70 by retraction of the movable part 77 of the pressure chamber 70 away from the stationary part 71. Movable part 77 rolls away from stationary part 71 on rails 80 and wheels 81. Movable part 77 is withdrawn and separated from stationary part 71 and brought into line with the path of travel of transfer car 32 and thus into the same position in which it (movable part 77) previously picked up the measured length of extrusion which it now holds in finally compressed bale form. When the transfer car 32 brings the next measured length of extrusion to the intensifier section 12, the completed bale is pushed off one end of movable part or transfer table 77 by the delivery of measured length over the other end of the table. In this manner, the bales are ejected from the apparatus.

Figure 13:
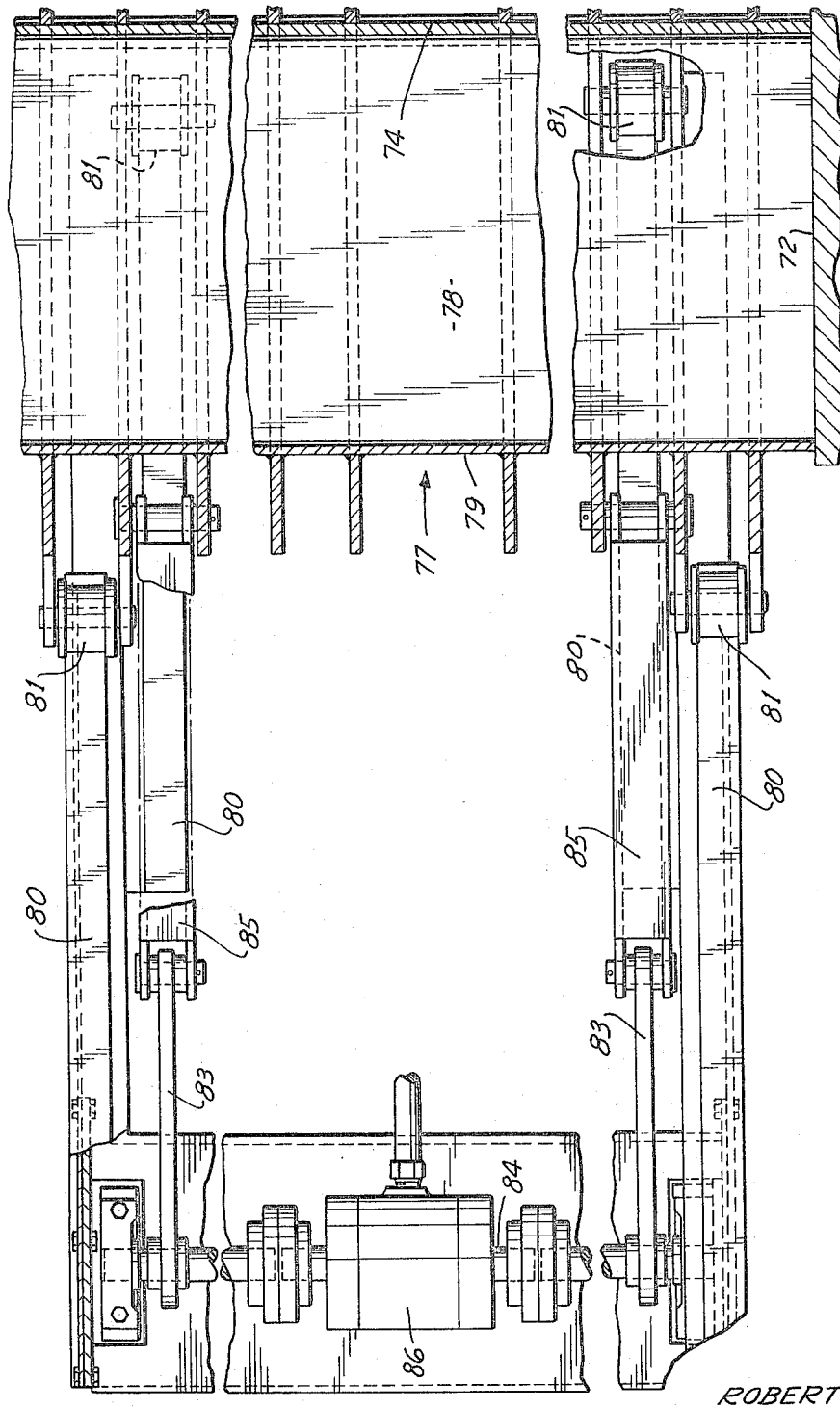
FIGURE 13 is a partial cross-sectional view through the intensifier section of the apparatus taken in the horizontal plane containing line 13—13 of FIGURE 11.

As shown particularly in FIGURE 13, rails 80 are arranged parallel to each other and grouped in two pairs, one near each end of pressure chamber 70, and extending transversely away therefrom. One rail 80 of each pair is associated with and supports a wheel 81 mounted underneath and near the edge of the horizontal or bottom wall 78 of movable portion 77 that is nearest stationary portion 71. The other rail 80 of each pair is associated with and supports a wheel 81 mounted underneath and near that edge of the horizontal or bottom wall 78 of movable portion 77 farthest from stationary portion 71. It will be apparent that the rail 80 of each pair which supports the wheels 81 mounted nearer stationary part 71 must extend laterally farther toward and beneath stationary portion 71 than that rail 80 of each pair which supports the other wheels 81. As shown in FIGURES 11 and 13, the rails extend parallel to each other and in a generally horizontal plane except for their respective up-turned end portions 82 nearer the stationary part and upon which the wheels 81 of movable part 77 ultimately come to rest when the two parts 71 and 77 of pressure chamber 70 are brought together in a closed position. End portions 82 of rails 80 are curved or turned upwardly an appropriate amount so that, as movable part 77 travels along them from its open position to its closed position, it is given a slight lift into its final closed position with respect to the stationary part 71 of the pressure chamber 70. Naturally, when separated and moved away from fixed part 71, movable part 77 first rides down upturned ends 82 of the respective rails 80 and is moved simultaneously downwardly and laterally outwardly from fixed part 71 a limited amount before being translated solely laterally away from stationary part 71. The advantages of the motion thus imparted to the movable section will be explained below in connection with the further description of the operation of intensifier section 12 of the apparatus. Movable part 77 is driven to and between its open and closed positions by a pair of crank arms 83 mounted together on common rotatable operating shaft 84 carried in the sub-base assembly and lying perpendicular to the direction of lateral travel of movable part 77. Crank arms 83 are connected to vertical wall 79 of movable part 77 by push bar links 85 pivotally connected at each of their ends to movable part 77 and a crank arm 83. Operating shaft 84 is rotated in one direction by a rotating hydraulic motor 86 and causes crank arms 83 to swing in a similar direction and to push movable part 77 toward stationary part 71. Rotation of operating shaft 84 by motor 86 in the opposite direction pulls movable part 77 away from stationary part 71. It will be noted that crank arms 83 and push bar links 85 have the necessary freedom of motion to permit the small up and down motion of movable part 77 imparted to it by upturned ends 82 of rails 80 as it approaches and leaves the fully closed position.

When the two parts of intensifier pressure chamber 70 are brought together into a closed position with a length of output extrusion W contained therein and movable end wall 76 is moved into and toward closed end wall 72, substantial pressures are built up within pressure chamber 70 which tend, among other things, to separate the fixed and movable portions 71 and 77 making up the chamber. In the wood pulp compacting machine described in this application for purposes of illustration and in other machines designed to accomplish similar results, it is especially desirable to provide strong and substantial means for locking the two parts of pressure chamber 70 together prior to the build-up of pressure within the chamber. As seen most clearly in FIGURES 10 and 12, I prefer to employ a number of movable hook links 90 for engagement with corresponding lugs 91 spaced apart longitudinally along the two diagonally opposite longitudinal edges of chamber 70 which form the parting lines between its movable and stationary portions 77 and 71. The longitudinally spaced apart hook links 90 and lugs 91 are arranged for convenience in operating pairs lying in generally the same transverse plane of chamber 70. It will also be noted that the spacing between hook links 90 and their associated lugs 91 along each of the longitudinally extending edges is non-uniform, the spacing between adjacent hook links 90 and lugs 91 decreasing toward the fixed closed end wall 72 of the pressure chamber. Such non-uniform spacing is intentionally provided in order to take care of and resist the higher pressures and forces tending to separate the two parts of the chamber at and near its fixed and closed end resulting from the advance of the movable end wall toward it and the increasing and more concentrated pressures produced thereby.

All of hook links 90 and cooperating lugs 91 operate in substantially the same manner so that only one of them will be described in detail. As shown in transverse cross section through pressure chamber 70 of the intensifier section 12 in FIGURE 11, the fixed upper horizontal and vertical side walls 73 and 74 meet together at a right angle to form two adjacent sides of the rectangular cross section of the chamber while the vertical side wall 79 and lower horizontal wall 78 of the movable part 77 meet together at a right angle and together form the other two sides of the rectangular cross section of the chamber. The movable and fixed portions 77 and 71 meet at diagonally opposite corners of the chamber's rectangular cross section. At each of these cross-sectional corners, which, in fact, are longitudinally extending and diagonally opposite edges of the box-like chamber, a heavy lug 91 projects from movable chamber part 77. Each of lugs 91 extends in a direction substantially parallel to a diagonal extending through the pressure chamber and between the two parting line corners.

A hook link assembly 90 is carried on stationary chamber 71 at each of the lug locations on movable chamber portion 77. Each hook link 90 is pivotally connected as at 92 to one end of one or a pair of swing links 93. The other end of each of the swing links 93 is pivotally connected as at 94 to an appropriate part of stationary chamber part 71. The end of each hook link 90 away from its point 92 of pivotal connection to swing link or links 93 is formed as a hook 95 having a relatively flat inside surface 96 for engagement with a corresponding flat bearing surface 97 on its associated lug 91.

An operating force is applied to hook link and swing link combinations through clevises 98 and tie rods 99 interconnecting each hook link 90 and the movable arm 100 of bell crank 101 mounted on rotatable operating shaft 102. Shaft 102 extends longitudinally along the upper longitudinal edge of pressure chamber 70 at which upper horizontal wall 73 and vertical side wall 74 of the chamber meet and is rotated by hydraulic cylinder 103 connected to bell crank 104 fixed to the shaft as shown in FIGURE 12. The clevises 98 and tie rods 99 extend horizontally and vertically, respectively, along the top and side walls 73 and 74 of the fixed chamber part. Each tie rod 99 is connected to a hook link 90 through a clevis 98 pivotally connected as at point 105. For an effective line of action, point of connection 105 lies on a line passing through point of connection 92 that is angularly related by a substantial angle approximately 90° to a line through point of connection 92 and hook end 95 of hook link 90.

As shown in FIGURE 11, the corresponding pair of diagonally opposite hook links 90 and lugs 91 is shown in solid lines in a closed position holding and locking together the two halves of pressure chamber 70 and is shown in broken outline in the released or open position assumed by them when the two halves of the chamber are unlatched. It will be apparent that when hook links 90 are in the locked position, counterclockwise rotation of operating shaft 102 and bell crank 101 attached to it will exert compression on each of the tie rod 99 and clevis 98 assemblies, pushing them longitudinally away from operating shaft 102. In the case of the upper hook link 90 and lug 91, the motion thus imparted to the horizontal tie rod and clevis assembly pushes the hook link and swing link outwardly and upwardly from the longitudinal edge along which it lies. Hook end 95 of hook link 90 tends to rise while simultaneously being moved laterally away from its associated lug 91 by the counterclockwise swinging movement imparted to its swing link 93 so that the total motion imparted to the hook end 95 of the hook link is an outward and slightly upward one away from its associated lug. Appropriate stops may be provided to limit the motion of the hook link-swing link combinations such as an upwardly extending stop 106 having a rounded outer end for engagement with a concavely-shaped edge of swing link 93 for limiting the clockwise motion of the swing link. The counterclockwise motion of each swing link 93 can conveniently be limited by engagement of the pivotally connected end of its clevis 98 attached to a hook link 90 with the same convexly-shaped edge portion of the swing link.

The lower hook link 90 operates in substantially the same way and differs primarily by the addition of a counterweight 107 producing a moment of the hook link acting about the point 92 of pivotal connection of the hook link with the swing link or links and counterbalancing a moment produced about the same point by the hook end portion of the hook link. Counterweight 107 is required in the case of the lower hook link assembly because of its different orientation with respect to gravity from that of the upper hook link assembly. An adjustable stop 107a may be arranged as shown in FIGURE 11 for engagement by each counterweight 107 to cause the counterweights to positively swing about their pivots 92 and to disengage hooks 95 from lugs 91.

The hook link and lug assembly described above provides a convenient and simple means for effectively locking together the two parts of pressure chamber 70. It is composed of a relatively few number of parts, each of which can conveniently be made as strong as necessary to resist the forces produced by pressures within the pressure chamber without departing from a simple concept of operation. It will be noted that when each hook link is in locking engagement with its associated lug, a line drawn through the two points 92 and 94 of pivotal connection on the swing links passes approximately through the center of engagement of the bearing surfaces 96 and 97 of hook end 95 and its associated lug 91 and, further, that such a line is substantially perpendicular to the diagonal interconnecting the two diagonally opposite latched-together corners of the pressure chamber. Preferably, points 92 and 94 of pivotal connection are so located with respect to engaging bearing surfaces 96 and 97 that there is a slight over-center toggle motion involved in the locking operation of the hook links. Also, the lugs and hook links are oriented so that they provide the maximum resistance to the line of action of the forces tending to separate the two parts of the pressure chamber. These separating forces are resisted solely by the strength of the hook links and their associated swing links and lugs and the strength of the clevis and tie rod assemblies is not relied upon for this purpose. Also, of course, the separating force is not transmitted to nor need it be resisted by a couple in the operating shaft 102.

It will be noted that in the form of compression chamber 70 shown in the drawings that the walls of the chamber are strengthened by deep webs 108. Webs 108 are attached to the exterior surfaces of the chamber walls and lie in planes transverse to the longitudinal axis of the chamber. The spacing between webs 108 is decreased at the fixed wall end of the intensifier compression chamber in the same manner as the spacing between the hook links and lugs for locking the two parts of the chamber together.

Hydraulic system

The preferred form of apparatus embodying my invention described above and shown in the drawings is actuated by hydraulic power. Two hydraulic systems are employed; one is related to and actuates the compactor section of the apparatus and the other actuates the separating and conveying section and the intensifier section.

Figure 14:
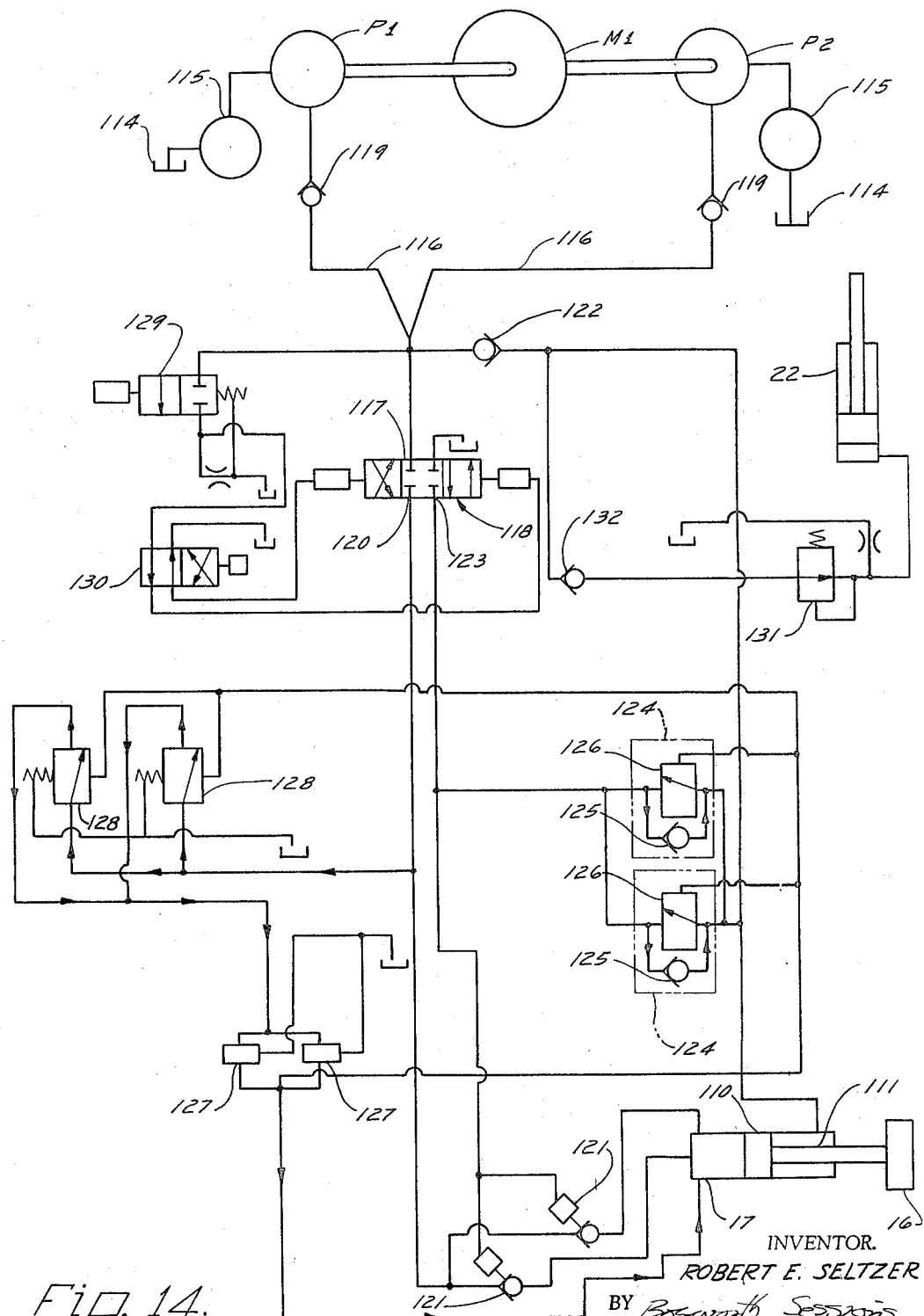
FIGURE 14 is a schematic diagram of the hydraulic system of the first-stage compression chamber section and the lifting and conveying section of the apparatus.

The hydraulic system for the compactor section of a preferred form of apparatus embodying my invention is shown schematically in FIGURE 14 and consists generally of main hydraulic cylinder 17 which operates baling head 16 in compression chamber 14 as described before, pumps $P_1$ and $P_2$ to supply the necessary fluid pressure for actuating main hydraulic cylinder 17, an electric motor $M_1$ to drive the pumps and the necessary system of control and sequencing valves to operate hydraulic cylinder 17 and other cooperating equipment in the manner desired and as described below.

In the particular embodiment of my invention described herein, main hydraulic cylinder 17, for example, has an eight-inch bore in which is fitted a suitable piston 110. A connecting rod 111 is attached to one face of piston 110 and extends outwardly through one end wall 112 of cylinder 17 for attachment to baling head 16. Cylinder 17 is ported on both the rod side and the blind side of piston 110. Main hydraulic cylinder 17 thus can be made to act in both directions by the introduction of fluid into the cylinder on one or the other sides of piston 110 and the removal of fluid from the cylinder on the opposite side of the piston.

A pair of pumps $P_1$ and $P_2$ are employed and driven by a single electric motor $M_1$. The pumps, for example, are variable volume oil hydraulic pumps of a conventional type. Such pumps have vanes carried and free to slide radially in the pump rotor. Surrounding and spaced away from the rotor is a hardened and ground pressure ring movable through positions of varying eccentricity with respect to the axis of the pump rotor. The eccentricity of the pressure ring creates an increasing suction area on one side of the rotor and a decreasing discharge area on the opposite side of the rotor. The particular variable volume pumps employed are equipped with a spring-loaded automatic pressure control governor as well as a fluid pressure-regulated governor for augmenting and/or overriding the control function of the governor springs.

Both pumps $P_1$ and $P_2$ are supplied with fluid from a common reservoir 114 through suitable filters 115. The discharge of each is connected by conduits 116 together and to the inlet port 117 of a four-way valve generally indicated at 118. A check valve 119 is provided in the discharge line from each of the pumps and arranged to prevent fluid from one pump from being pumped through the discharge outlet into the other pump.

One of the outlet ports 120 of four-way valve generally indicated at 118 is connected to cylinder 17 on the blind side of piston 110 through a pair of pilot-operated check valves 121 arranged in parallel. Both of these check valves are arranged to permit the flow of fluid into cylinder 17 and to prevent fluid flow in the opposite direction except when actuated and opened to reverse flow by suitable pilot pressure. Preferably, two check valves 121 of substantially different sizes are used in parallel. For example, one may be a three-inch valve able to handle a 240-gallon per minute flow. The other valve, for example, may be ⅜-inch size and is employed to decompress pressure-charged main cylinder 17 since its opening ratio is high enough to permit it to be opened against full operating pressure in main cylinder 17.

The rod side of cylinder 17 is connected to port 117 of four-way valve 118 through a check valve 122 arranged to conduct fluid toward the four-way valve 118. A connection is also provided between rod end of cylinder 17 and port 123 of four-way valve 118. A pair of sequence valves 124 are arranged in parallel between cylinder 17 and valve 118 and each includes a check valve 125 arranged to permit fluid flow away from the four-way valve and a pilot-operated valve 126 arranged to permit fluid flow toward the four-way valve. The pilot-operated valves 126 are responsive to pilot pressure sensed in cylinder 17 on the blind side of piston 110.

Additional high pressure is provided at the end of the compression stroke of baling head 16 by a pair of pressure boosters 127 connected in a parallel path to that described above between port 120 of four-way valve 118 and cylinder 17 on the blind side of piston 110. Pressure boosters 127 are brought into operation by a pair of sequence valves 128 arranged in parallel with each other as shown in the drawings. Valves 128 are operated to permit pump pressure to be applied to pressure boosters 127 by pilot pressure sensed on the blind side of piston 110 in cylinder 17. Pressure boosters 127 are of a conventional type and achieve an increase in pressure through a reduction in volume. Thus, the final part of the compaction stroke is slowed down but the pressure made available is increased. In one embodiment of the apparatus disclosed herein, pressure boosters providing a fivefold increase in pressure and corresponding reduction in volume deliver 5,000 p.s.i. from 1,000 p.s.i. pump pressure to develop a 125-ton force with a cylinder having an eight-inch diameter.

Four-way valve 118 is operated by an electrically actuated two-way valve 129 which permits or prevents pump pressure from reaching four-way pilot valve 130 for delivery thereby through the appropriate and desired connections to valve 118. The electrical solenoid of valve 129 is responsive to sensing means in hopper 18 adapted to detect the flow or presence of material in the hopper or chute. When no material is present, valve 129 is closed. Rotary four-way pilot valve 130 is mechanically operated by linkage on baling head 116.

The hydraulic system associated with compactor section 10 also includes hydraulic operating cylinder 22 described above in connection with the toggle mechanism for controlling the lateral dimensions of the discharge outlet of compression chamber 14. Cylinder 22 is supplied with pump pressure through an adjustable automatic pressure reducing and regulating valve 131 connected through check valve 132 to the upstream side of check valve 122.

In operation, when hopper or chute 18 is empty of material to be processed, pumps $P_1$ and $P_2$ of the compactor hydraulic section deadhead at low pressure. Main four-way valve 118 is shifted to provide hydraulic fluid to the rod end of main cylinder 17, thereby holding piston 110 and baling head 16 retracted. When material is present and sensed in hopper 18, power is supplied to the solenoid of two-way valve 129, permitting oil flow to rotary four-way valve 130 for operation of main four-way valve 118. Main four-way valve 118 is shifted to permit oil to be supplied the blind side of piston 110 in order to advance baling head 16. During the advance stroke, oil from both pumps $P_1$ and $P_2$ flows through main four-way valve 118 and pilot-operated check valve 121 into the blind end of the cylinder. Oil is exhausted from the rod end and flows through check valve 122 and is added to pump oil providing a differential or regenerative action.

As the pressure in cylinder 17 on the blind side of piston 110 builds up to a predetermined level, full-volume pump $P_1$ deadheads and low-volume pump $P_2$ takes over at another and preferably higher predetermined pressure. The matched sequence and loading valves 124 are pilot operated to let oil from the rod end of cylinder 17 return to reservoir 114 through main four-way valve 118. Check valve 122 prevents pump oil from spilling through sequence unloading valves 124. At a preferably higher predetermined pressure, sequence valves 128 open, diverting pump oil to pressure boosters 127 in order to provide the higher pressure for the final few inches of the advance stroke.

The stroke of main cylinder 17 is reversed when the end of the advance stroke in reached by mechanical actuation of rotary four-way pilot valve 130 and the consequent reversal of main four-way valve 118. Pilot-operated check valves 121 are supplied with pressures through a pilot line connected to port 123 of four-way valve 118, opening them so that piston 110 can retract. As long as hopper 18 is kept filled or charged, the press will operate continuously.

The hydraulic system for the intensifier section and the separating and conveying section of a preferred form of apparatus embodying my invention is shown schematically in FIGURE 15 and consists generally of main intensifier actuator 75 which operates movable end wall 76 in pressure chamber 70 as described above, pumps $P_3$, $P_4$ and $P_5$ for supplying the necessary fluid pressure, an electric motor $M_2$ to drive the pumps, gripping and lifting hydraulic actuator 51, transfer actuator 58, rotary hydraulic motor 86 for actuating movable part 77 of the intensifier pressure chamber 70, and locking actuator 103 together with the necessary system of control and sequencing valves to operate the main intensifier actuator 75 and the cooperating equipment in the manner desired and described below.

In the embodiment of my invention described herein and shown in FIGURE 15, main hydraulic actuator 75 comprises a main hydraulic cylinder 140 fitted with a suitable piston 141. Connecting rod 142 is attached to the piston and extends outwardly through one end wall of cylinder 140 for attachment to movable end wall 76 of intensifier pressure chamber 70. Cylinder 140 is ported on both the rod side and the blind side of piston 141 and can thus be made to act in both directions by the introduction of fluid into the cylinder on one or the other sides of piston 141 and the removal of fluid from the cylinder on the opposite side of the piston.

Three pumps, $P_3$, $P_4$ and $P_5$ are arranged in tandem and driven by electric motor $M_2$. Two of the pumps, $P_3$ and $P_4$ are high pressure pumps and pump $P_5$ is preferably a lower pressure, variable delivery, vane pump. Pump $P_5$ is used for all auxiliary functions.

The pumps are supplied with fluid from a reservoir 143 through suitable filters 144. The discharge of pump $P_5$ is connected to inlet port 145 of main four-way valve 146, to inlet port 147 of auxiliary four-way valve 148 for controlling the supply oil to gripping cylinder 51 and transfer actuator 58, to inlet port 149 of auxiliary four-way valve 150 for controlling the supply of oil to rotary hydraulic motor 86 and to inlet port 151 of auxiliary four-way valve 152 arranged to control the supply of oil to locking and unlocking actuator 103.

Port 153 of main four-way valve 146 is connected to main hydraulic cylinder 140 on the blind side of piston 141 through a pilot-operated check valve 154. Valve 154 is arranged to permit the flow of fluid into cylinder 140 and to prevent oil flow in the opposite direction except when actuated and opened to reverse by suitable pilot pressure supplied from the rod side of cylinder 140. Pilot-operated check valve 154, together with a smaller pilot-operated check valve 155 connected between the blind side of cylinder 140 and reservoir 143, performs the same general function as the large and small pilot-operated check valves 121 found in the compactor hydraulic section, i.e., to decompress pressure charged main cylinder 140.

Port 170 of main four-way valve 146 is connected to main hydraulic cylinder 140 on the rod side of piston 141 through check valve 171 arranged to permit oil flow from four-way valve 146 into cylinder 140 and to prevent oil flow in the opposite direction. Connected in parallel with check valve 171 is unloading valve 172 arranged as shown in FIGURE 15 to permit oil flow out of cylinder 140 and into port 170 of four-way valve 146 when pressure applied to the blind side of piston 141 exceeds a predetermined level. In addition, a check valve 173 is connected between the outlet of pump $P_5$ and the rod side of piston 141 and arranged to permit oil flow out of cylinder 140 and to prevent fluid flow directly from pump $P_5$ into cylinder 140.

It will be apparent that check valves 171 and 173, together with unloading valve 172, comprise a regenerative oil supply arrangement for the fast traverse of piston 141 in cylinder 140 at the beginning of the compression stroke. Thus, until the pressure builds up sufficiently on the blind side of piston 141 to dump unloading valve 172, the oil exhausted from the rod side of cylinder 140 is added to the oil supplied by pump $P_5$ via check valve 173. Near the end of the compression stroke, when pressure increases on the blind side of piston 141, unloading valve 172 is actuated by pilot pressure and the additional oil remaining on the rod side of cylinder 140 is diverted to reservoir 143 via port 153 of four-way valve 146.

The discharges of high pressure pumps $P_3$ and $P_4$ are each connected to a high pressure inlet 156 on the blind side of piston 141 through check valves 157 and 158, respectively. Pumps $P_3$ and $P_4$ are sized or otherwise arranged to provide different volumes of oil and, consequently, to have different pressure limits when driven in tandem by a common motor, for example $M_2$. As shown in FIGURE 14, pump $P_4$ is a higher volume delivery pump than pump $P_3$. A high pressure unloading valve 159 is provided in the discharge line of high volume pump $P_4$ and upstream of check valve 158. Unloading valve 159 is designed to dump pressure from pump $P_4$ at a predetermined pressure level as sensed by the pilot pressure line connected to the downstream side of check valve 158.

The low volume pump $P_3$ is also provided with a high pressure unloading valve 160 arranged to dump fluid from its discharge line and on the upstream side of check valve 157 in response to pressure sensed through a pilot line at the downstream side of check valve 157.

In operation, the separating and conveying section and the intensifier section of the system assumes an idling position, waiting for material from the compactor section as follows: transfer arm actuator 58 is retracted, positioning transfer car 32 adjacent the discharge outlet of compactor section 10; gripping arm actuator 51 is retracted, holding lower arm elements 37 of gripping arms 36 apart and lowered ready to receive and grip the extrusion output from compactor section; rotating hydraulic motor 86 is turned to position the transfer table or movable part 77 of intensifier pressure chamber 70 separated and away from stationary part 71 and in the path of rails 30 of the separating and conveying section for receiving a length of extrusion; and, actuator 103 is retracted holding hook links 90 in their unlocked position. Four-way valves 146, 148, 150 and 152 are as shown in FIGURE 15 and piston 141 is held retracted in main cylinder 140 by pressure applied from pump $P_5$ through port 170 of four-way valve 146 to the rod end of cylinder 140. Pilot check valves 154 and 155 are held open by pilot pressure sensed in main cylinder 140 on the rod side of piston 141, opening the blind end of main cylinder 140 to tank or reservoir 143. It will be noted that high pressure pumps $P_3$ and $P_4$ are thus pumping to tank at this time.

The arrival of a length of extrusion from the discharge outlet of compactor section 10 between gripping arms 36 is detected by any suitable means such as light- or sound-sensitive detecting cells and associated sources of light or sound. Preferably, the detecting device is so located as to indicate the arrival of the forwardmost end of the entrusion at a point adjacent the corresponding end of the gripping flanges 40 attached to the gripping arms. The detection of the material at this point relative to the gripping mechanism causes the solenoid 161 associated with four-way valve 148 to be energized by means of conventional electrical circuitry. Energization of solenoid 161 operates four-way valve 148 against the bias of spring 162, sending oil to the blind side of gripping cylinder 51 as shown in FIGURE 15. Thus, cylinder 51 is caused to extend, bringing gripping arms into contact with the opposite sides of the length of extrusion projecting therebetween and also to lift and shearingly separate a length of extrusion corresponding to the length of gripping flanges 40 from the extrusion output of the compactor section.

Following the gripping engagement with and commencement of separation and lifting of a measured length of extrusion by gripping arms 36 as a result of the extension of cylinder 51, pressure in the discharge of pump $P_5$ builds up, opening sequence valve 163 piloted to its own input side, permitting oil to flow to the blind side of transfer actuator 58, causing its extension and moving transfer car 32 from its position at the output of compactor section 10 to a position over movable table part 77 of intensifier section 12. As a result of the sequencing of the operation of gripping cylinder 51 and transfer actuator 58 as described, the length of extrusion to be separated and conveyed tends initially to be subjected to only shearing separating forces followed by an increasing pulling force and decreasing shearing forces as transfer actuator 58 begins to operate. This means of separation has been most effective and contributes substantially to the success of the process.

When the length of extrusion reaches its position over movable table part 77, a limit switch actuated, for example, by transfer car 32 de-energizes solenoid 161 of four-way valve 148, permitting spring 162 to position the valve as shown in FIGURE 15. Pressure from pump $P_5$ thereupon is delivered to the rod side of gripping cylinder 51, lowering the length of extrusion onto movable table part 77 and opening gripping arms 36 to disengage them. Thereupon, pressure builds up in the discharge of pump $P_5$, causing piloted sequence valve 164 to permit oil to reach the blind side of transfer cylinder 58, thereby returning transfer car 32 to its position adjacent the outlet of compactor section 10. It will be noted that piloted sequence valves 163 and 164 operate together and with double-acting transfer cylinder 58. Each is piloted to its own input side and contains a check valve bypassing the sequence valve. The check valves are arranged so that when sequence valve 163 feeds oil to one end of transfer cylinder 58, oil is exhausted from the other end through the check valve of sequence valve 164 and vice versa.

The return of transfer car 32 to its position adjacent the discharge end of compactor section 10 acts to operate solenoid 165 controlling four-way valve 150 to permit oil to cause rotary hydraulic actuator 86 to move movable table part 77 into chamber-completing position with stationary part 71. Arrival of movable part 77 in chamber-completing position with stationary part 71 actuates a suitable control device, such as a limit switch, to energize solenoid 166 associated with four-way valve 152, permitting oil to flow to the blind side of locking actuator 103 and to thereby lock the two parts of the intensifier compression chamber together.

As the hook links 90 become positively engaged with lugs 91, another limit switch is operated, energizing solenoid 167 controlling main four-way valve 146 so as to permit oil to enter the blind end of cylinder 140 through piloted check valve 154 and to leave the rod side. Reduction of pressure on the rod side of cylinder 140 reduces the pilot pressure to piloted check valves 154 and 155, permitting pressure to build up on the blind side of piston 141. The early part of the compression stroke is accomplished rapidly by operation of the regenerative circuit arrangement described above.

As the pressure increases and piston 141 advances movable wall 76 in intensifier pressure chamber 70, the check valves 154 and 155 protect pump $P_5$ from the high pressure and pumps $P_3$ and $P_4$ take over. Both pumps feed cylinder 140 through high pressure inlet 156 until pump $P_4$ is unloaded by operation of its piloted unloading valve 159 at a predetermined high pressure. Pump $P_3$ continues to supply a small volume of oil at high effective pressure up to a maximum permitted by relief valve 160.

Preferably, pump $P_3$ is a radial piston pump as, for example, described in U.S. Patents Nos. 2,683,423 and 2,461,235. Such a pump permits selective portions of its total volume to be discharged at various discharge ports. As employed in the hydraulic circuit of FIGURE 15, a portion of the output of the pump is subject to control by unloading valve 160 while another portion bypasses this unloading valve and permits a constant high pressure to be applied for a predetermined length of time on the length of extrusion being compressed in the intensifier pressure chamber 70.

I have found that an appreciable dwell time of movable end wall 76 in its advanced position increases the percent reduction in the final volume and the final density to which damp wood pulp can be processed by apparatus embodying my invention. For example, I have compressed damp pulp, 13 percent bone dry, to a final density of more than 50 pounds per cubic foot using a final pressure of approximately 2,000 p.s.i. applied for approximately 100 seconds. It will be noted that the use of several pumps as explained above helps to make possible a relatively rapid advance of movable end wall 76 in pressure chamber 70. This advance is slowed down only as required by the increased pressures encountered toward the end of the advance stroke.

In order to remove the intensely compacted bale from the intensifier compression chamber 70, piston 141 and cylinder 140 must be reversed. This requires high pressure on the blind side of piston 141 to be reduced. This is accomplished by positioning four-way valve 146 so that pump $P_5$ feeds the rod end of cylinder 140 through check valve 171 and builds a pressure therein sufficient to open pilot-operated check valves 154 and 155, the latter being smaller and able to open against the extreme high pressure in the cylinder when the piston is fully advanced. Check valve 155 bleeds the pressure down to a level at which check valve 154 opens, permitting piston 141 to retract. Preferably, provision is made during this decompression to hold hook links 90 lockingly engaged with lugs 91 until all pressure is removed from the press. When the two parts of intensifier pressure chamber 70 are unlocked, movable table part 77 is separated from stationary part 71 by operation of rotary hydraulic motor 86, removing the finished and finally processed bale from the pressure chamber 70.

The electrical circuits associated with the hydraulic system described above are entirely conventional and well within the ability of one skilled in the art to provide from the limited description above. The electrical circuits themselves form no particular part of this invention. Preferably, the electrical system as it relates to the hydraulic system contains safety features commensurate with the forces and pressures involved in the apparatus.

Those skilled in the art will appreciate that various changes and modifications can be made in the apparatus described herein without departing from the spirit and scope of the invention.

I claim:
1. A process for converting a mass of loose material of a lesser average density and greater volume into a multi-faced bale having a self-retaining shape and of greater average density and lesser volume comprising the steps of
   (1) successively compressing measured quantities of loose material of lesser average density and greater volume into layers of a self-retaining shape and greater average density and lesser volume and each having generally oppositely disposed and parallel faces corresponding dimensionally to cross sections of the bale to be formed, said faces being spaced apart a distance that is a fraction of the length of the bale to be formed,
   (2) accumulating a plurality of layers produced in Step 1 in a face-to-face relationship and pressing each succeeding layer accumulated together in said facing relationship with preceding accumulated layers to produce a bale having a self-retaining shape comprised of a pressed-together plurality of said layers,
   (3) compressing as a unit and reducing the volume of the bale produced in Step 2 to produce a smaller and more dense bale having a self-retaining shape and comprised of the loose material introduced in Step 1.
2. A process for converting a continuously supplied flow of loose material of lesser average density and greater volume into a succession of periodically produced multi-faced bales having a self-retaining shape and of greater average density and lesser volume comprising the steps of
   (1) successively compressing measured quantities from a continuous flow of loose material of lesser average density and greater volume into layers of a self-retaining shape and of a greater average density and a lesser volume and each having generally oppositely disposed and parallel faces corresponding dimensionally to cross sections of the bale to be formed, said faces being spaced apart a distance that is a fraction of the length of the bale to be formed.
   (2) continuously accumulating the layers successively produced in Step 1 in a face-to-face relationship and pressing each succeeding layer accumulated together in said facing relationship with preceding layers to form a continuous extrusion having a self-retaining shape and comprised of a pressed-together plurality of said layers,
   (3) successively removing lengths from the forward portion of the continuous extrusion,
   (4) successively confining each length of extrusion removed in Step 3 within a cubic space having a lateral cross section that is substantially congruent with the lateral cross section of each length,
   (5) uniformly applying pressure to and maintaining it on the opposite ends of the extrusion length of Step 3 in a direction normal to the faces of the layers comprising the length and a direction tending to reduce the overall longitudinal dimension of the length while maintaining the lateral cross-sectional dimension of the confining space in Step 4.
3. The process in accordance with claim 2 in which the pressure applied in Step 5 is maintained for substantially more than half the time required by Steps 1 and 2 to produce a length of continuous shape-retaining extrusion removed in Step 3.
4. The process in accordance with claim 2 in which the separation of lengths from the forward portion of the continuous extrusion as in Step 3 is accomplished by shearing and tension forces applied together in simultaneously decreasing and increasing amounts, respectively, said shearing force being applied in a plane parallel to the faces of the layers comprising the extrusion length and said tension force being applied normal thereto.
5. Apparatus for compacting, condensing and forming wood pulp and like loose material into relatively high density bales comprising the combination of
   compactor and extruder means,
   separating and conveying means, and
   intense pressure bale-forming means,
   said compactor and extruder means comprising a charging inlet for receiving loose material, a compaction chamber into which said charging inlet delivers loose material, a discharge outlet from said compaction chamber and means for compacting and condensing the loose material received by said charging inlet and delivered into said compaction chamber and for continuously extruding compacted material from said compaction chamber through said discharge outlet in the form of a continuous extrusion of packed-together and condensed material,
   said separating and conveying means comprising separating means operable adjacent said discharge outlet of said compactor and extruder means for separating a measured length of the forward end of the compacted material extrusion extruded from said discharge outlet and conveying means for conveying the separated measured length from its point of separation from the extrusion to said bale-forming means,
   said bale-forming means comprising a compression chamber, means associated with said conveying means and said bale-forming means to receive the measured length of compacted and extruded material from said conveying means and for delivering the measured length of material to said bale-forming means com- pression chamber, means operable in said compression chamber of said bale-forming means for applying pressure separately and successively to each length of extrusion delivered to it by said conveying means and for reducing the volume and increasing the density of the length of extrusion to form a bale.

6. Apparatus for compacting, condensing and forming wood pulp and like loose material into relatively high density bales comprising the combination of compactor and extruder means,
    separating and conveying means, and
    intense pressure bale-forming means,
    said compactor and extruder means comprising a charging inlet for receiving loose material, a compaction chamber into which said charging inlet delivers loose material, a discharge outlet from said compaction chamber and means for compacting and condensing the loose material received by said charging inlet and delivered into said compaction chamber and for continuously extruding compacted material from said compaction chamber through said discharge outlet in the form of a continuous extrusion of packed-together and condensed material,
    said separating and conveying means comprising
        traveling means movable to and between positions adjacent said discharge outlet of said compactor and extruder means and said bale-forming means,
        gripping means carried by and mounted on said traveling means, said gripping means being disposed for grippingly engaging a length of said extrusion and shearingly separating said engaged length from the remainder of said extrusion when said traveling means is in a position adjacent said discharge outlet, and being disposed for releasing and depositing said engaged length at said bale-forming means when said traveling means is in a position adjacent thereto,
    said bale-forming means comprising
        a box-like compression chamber having generally horizontal top and bottom walls, two generally vertical side walls and an end wall and a piston wall corresponding to and opposite said end wall mounted for reciprocating movement toward and away from said end wall, said bottom wall and one of said side walls being joined together into movable assembly and separable from the other ones of said walls and from said position wall,
        transfer means for transporting said movable assembly laterally to and between a position of relationship with said other walls completing said compression chamber and a position spaced from said other wals for receiving lengths of extrusion deposited by said separating and conveying means on said bottom wall of said assembly and for delivering lengths of extrusion to and retrieving them from said compression chamber,
        means to lock said movable assembly together with said other walls in chamber-completing position and to unlock said movable assembly from said other walls to permit their separation,
        means to move and apply power to said piston wall.

7. Apparatus for compacting, condensing and forming wood pulp and like loose material into relatively high density bales comprising the combination of compactor and extruder means,
    separating and conveying means, and
    intense pressure bale-forming means,
    said compactor and extruder means including a compression chamber having a charging inlet adapted to receive loose material, an elongated discharge outlet, and reciprocating piston means mounted for stroking movement toward and away from said discharge outlet and past said charging inlet and adapted to compact loose material in said chamber with each stroke of said piston means toward said discharge outlet and to pack and to press the compacted chamberful of material against and together with the preceding compacted chamberful of material and into said discharge outlet,
    said separating and conveying means having
        a traveling element movable to and between said compactor and extruder means and said bale-forming means,
        a pair of laterally spaced and opposed gripping arms mounted on and transportable by said traveling element to and from a position adjacent said discharge outlet and adapted to be disposed astride a continuous extrusion issuing therefrom,
        pivotally connected swinging link means for mounting said pair of gripping arms on said traveling element for movement toward and away from each other and for adapting and permitting said gripping arms when disposed astride a continuous extrusion issuing from said discharge outlet to move together into gripping engagement with a length and shearingly separate it from said continuous extrusion for delivery to and deposit at said bale-forming means by movement of said traveling element and lowering and releasing gripping arm movements,
        first actuating means for moving said traveling element and second actuating means for moving said gripping arms,
    said bale-forming means adapted to receive and compress as a unit each length of extrusion delivered to it by said separating and conveying means and comprising
        a box-like compression chamber having generally horizontal top and bottom walls, two generally vertical side walls and an end wall and a piston corresponding to and opposite said end wall mounted for reciprocating movement toward and away from said end wall, said bottom wall and one of said side walls being joined together into a movable part and separable from the other ones of said walls joined together to form a fixed part and from said piston,
        transfer means for transporting said movable part laterally to and between a first position of relationship with said other part completing said compression chamber and a second position spaced from said other part and adapted to receive lengths of extrusion deposited by said separating and conveying means on said bottom wall of said movable part and adapted to deliver lengths of extrusion to and retrieve them from said compression chamber,
        said transfer means including horizontally parallel and laterally spaced apart rails extending between said first and second positions of said movable part and wheels on said movable part having rolling engagement with and for carrying said movable part along said rails, said rails having vertically upwardly inclined ends adjacent said first position of said movable part for imparting a combined horizontal and vertical component of motion to said movable part as it closely approaches and leaves its said first position of relationship with said other part,
        means to lock said movable part together with said fixed part in chamber-completing position and to unlock said movable part from said fixed part to permit their separation,
        said means to lock and unlock said movable part and said other part including a plurality of sets of cooperating hook links and lugs for engagement thereby, each lug being fixedly attached to said movable part and each hook link being attached to said fixed part by a swing link having one of its ends pivotally connected to said fixed part and the other end pivotally connected to said hook link, each of said hook links swingable on its associated swing link toward and away from its cooperating lug and respectively out of and into locking engagement with its associated lugs, and means on said fixed part of said compression chamber for simultaneously operating all of said hook links to lock and unlock said two parts of said compression chamber.

8. Apparatus for grasping and lifting a load comprising
 a supporting framework,
 a pair of gripping arms each having an actuating portion generally at one end and a gripping portion generally at the other end,
 connecting means for mounting and connecting said arms on and to said framework each disposed in a generally vertical position and laterally spaced from and opposed to the other with said gripping portion hanging down from said framework, said connecting means including a swinging link associated with each of said arms and having one end pivotally connected to said framework and the other end pivotally connected to its associated gripping arm centrally of its actuating and gripping portions, said links having freedom relative to said framework to swing upwardly, outwardly and away from each other,
 said arms having relative rotation with said swinging links and swinging displacement along an arcuate path with respect to said framework,
 actuating means associated with said gripping arms and acting between said actuating portions thereof for moving them toward and away from each other,
 whereby extension of said actuating means pivots said gripping arms about their connections with said swinging links moving said actuating portions away from each other and said gripping portions toward each other until limited by said gripping portions encountering and coming into gripping engagement with opposite sides of a load whereupon further extension of said actuating means pivots said gripping arms generally about their gripping portions engaging the load and swings said swing links outwardly and apart and upwardly relative to said framework lifting said gripping arms and said load grippingly engaged by them and,
 whereby retraction of said actuating means brings about movements of said gripping arms and said swing links opposite to those produced by extension and which lower and release a load engaged and lifted by and between said gripping arms.

9. The apparatus according to claim 8 in which said gripping portion of each of said gripping arms includes an elongated and horizontally extending gripping bar, said bars on said gripping arms being generally parallel to each other and having a pair of laterally opposite ends.

10. The apparatus according to claim 8 together with a pair of laterally spaced parallel rails,
 wheels mounted on said supporting framework and having rolling engagement with said rails for permitting said supporting framework to move on and along said rails,
 means to move said framework on said wheels along said rails,
 whereby said gripping arms are able to grasp and lift a load at any point along said rails and to lower and release a load at the same and any other point along said rails and to convey a lifted load between two different points along said rails.

11. A box-like compression chamber having a generally polyangular transverse cross section and longitudinally extending corners at the angles of its cross section and comprising
 two parts separable from each other in a plane containing two opposite ones of said longitudinally extending corners, said two separable parts being adapted to be selectively locked together to withstand high internal pressures in said compression chamber tending to separate them and to be unlocked to permit their separation,
 means for locking together and unlocking said two separable parts comprising
  a plurality of hook links mounted on one of said separable parts along both of said longitudinally extending and separating corners,
  a lug mounted on the other of said separable parts along both of said longitudinally extending and separating corners and opposite each hook link on said one of said separable parts when said two separable parts are together and engageable by its opposite hook link for holding said parts together against internal pressure in said compression chamber,
 each hook link having a lug-engaging portion and including a swing link associated with each hook link, one end of each swing link having a point of pivotal connection with said one of said two separable parts and another point of pivotal connection with its associated hook link at a point spaced from said lug-engaging portion thereof, said two points of pivotal connection on each of said swing links being so related and arranged that said lug-engaging portion of its associated hook link is carried toward locking engagement with its opposite lug when said swing link swings away from its opposite lug and away from locking engagement when it swings toward its opposite lug.

12. The apparatus according to claim 11 including means for moving all of said hook links into and out of locking engagement with said lugs together, said means comprising
 a shaft mounted for rotation externally of said one of said separable parts and intermediate and axially parallel to said opposite corners of said compression chamber which lie generally in the plane of separation of its two separable parts,
 a bell crank fixed to said shaft and associated with each of said hook links,
 a rod associated with each bell crank and having a point of pivotal connection at one end therewith and at its other end with the hook link associated therewith, said point of pivotal connection of said rod and said hook link being out of alignment with said lug-engaging portion of said hook link and its point of pivotal engagement with its swing link,
 means to rotate said shaft,
 whereby rotation of said shaft in one direction moves said bell cranks fixed thereto and thus moves said rods generally axiallly to swing said hooks in one direction and said swing links in a direction opposite thereto so as to move said lug-engaging portions out of locking engagement with said lugs and rotation of said shaft in the opposite direction moves said bell cranks and thus moves said rods generally axially to swing said hooks in the other direction and said swing links in a direction opposite thereto so as to move said lug-engaging portions into locking engagement with said lugs.

13. The apparatus according to claim 11 in which said compression chamber has a uniform rectangular transverse cross section and longitudinally extending corners at each of the four angles of its cross section, said two parts being separable along two diagonally opposite ones of said corners lying generally parallel to each other in said plane of separation.

14. The apparatus according to claim 13 in which said points of pivotal connection of the ends of each of said swing links and said lug-engaging portion of said hook link connected thereto are all generally aligned normal to said plane of separation.

15. The apparatus according to claim 13 in which said one of said two separable parts is fixed and said other is movable and comprises a horizontal and a vertical wall joined together along a common longitudinally extending one of said corners, and including transfer means for moving said movable part into and out of engagement with said fixed part along a path generally normal to said plane of separation and with said horizontal wall maintained in its horizontal attitude when said parts are close to engagement.

16. The apparatus according to claim 15 in which said transfer means comprises a set of parallel tracks laterally spaced apart and extending longitudinally in a horizontal attitude and normal to said longitudinally extending corners of said compression chamber and toward and away from and fixed relative to said fixed part, at least three wheels mounted for rotation on said movable part and so arranged as to each having rolling engagement with its own one of said rails for movement of said movable part toward and away from said fixed part with the horizontal attitude of said horizontal wall maintained and spaced below its level at engagement with said fixed part, inclined means on said rails so related and arranged as to be engaged by all of said wheels simultaneously to raise and lower horizontally said movable part into and out of engagement with said fixed part, actuating means to move said movable part on and along said rails and inclined means.

References Cited by the Examiner

UNITED STATES PATENTS

| 251,768 | 1/1882 | Dederick | 100—140 X |
| 252,922 | 1/1882 | Bacon | 100—138 X |
| 399,568 | 3/1889 | Seeley | 100—251 X |
| 1,229,628 | 6/1917 | Lowrie | 100—254 X |
| 1,798,412 | 3/1931 | Grab | 214—392 |
| 2,406,541 | 8/1946 | Hewlett | 100—138 |
| 2,757,603 | 8/1956 | Wilson et al. | 100—252 X |
| 3,009,413 | 11/1961 | Alexander | 100—139 X |
| 3,024,719 | 3/1962 | Englund | 100—191 X |
| 3,035,513 | 5/1962 | Johnson | 100—255 X |
| 3,075,456 | 1/1963 | Uschmann | 100—138 |
| 3,120,172 | 2/1964 | Enloe | 100—41 |
| 3,161,309 | 12/1964 | Baudhuin et al. | 214—392 |
| 3,185,074 | 5/1965 | Jay et al. | 100—248 X |
| 3,212,431 | 10/1965 | Raab | 100—41 |

FOREIGN PATENTS 21,841   1895   Great Britain.

BILLY J. WILHITE, *Primary Examiner.*